US008988690B2

(12) United States Patent
Deck et al.

(10) Patent No.: US 8,988,690 B2
(45) Date of Patent: Mar. 24, 2015

(54) INTERFEROMETRIC ENCODER SYSTEMS

(71) Applicant: Zygo Corporation, Middlefield, CT (US)

(72) Inventors: Leslie L. Deck, Middletown, CT (US); Peter J. de Groot, Middletown, CT (US); Michael Schroeder, East Hampton, CT (US)

(73) Assignee: Zygo Corporation, Middlefield, CT (US)

( * ) Notice: Subject to any disclaimer, the term of this patent is extended or adjusted under 35 U.S.C. 154(b) by 33 days.

(21) Appl. No.: 14/044,222

(22) Filed: Oct. 2, 2013

(65) Prior Publication Data
US 2014/0049782 A1    Feb. 20, 2014

Related U.S. Application Data

(63) Continuation of application No. 13/326,117, filed on Dec. 14, 2011, now Pat. No. 8,670,127, which is a continuation of application No. 13/028,787, filed on Feb. 16, 2011, now Pat. No. 8,300,233.

(Continued)

(51) Int. Cl.
  *G01B 9/02*    (2006.01)
  *G01D 5/26*    (2006.01)
  *G01D 5/38*    (2006.01)
(52) U.S. Cl.
  CPC . *G01D 5/266* (2013.01); *G01D 5/38* (2013.01)
  USPC .......................................... 356/486; 356/494

(58) Field of Classification Search
  CPC ...................................................... G01D 5/3473
  USPC .................................................. 356/486, 494
  See application file for complete search history.

(56) References Cited

U.S. PATENT DOCUMENTS 3,090,279 A    5/1963  Chisholm
3,891,321 A    6/1975  Hock (Continued)

FOREIGN PATENT DOCUMENTS

CN    1477372    2/2004    ............. G01B 11/26
CN    1538149    10/2004   ............. G01D 5/347

(Continued)

OTHER PUBLICATIONS

Divoky et al., "Off-plane diffraction in pulse stretcher and compressor", *IEEE Conference on Lasers and Electro-Optics Europe*, pp. 432 (2005).

(Continued)

*Primary Examiner* — Jonathan Hansen
(74) *Attorney, Agent, or Firm* — Fish & Richardson P.C.

(57) ABSTRACT

A method for determining information about changes along a degree of freedom of an encoder scale includes directing a first beam and a second beam along different paths and combining the first and second beams to form an output beam, where the first and second beams are derived from a common source, the first beam and second beams have different frequencies, where the first beam contacts the encoder scale at a non-Littrow angle and the first beam diffracts from the encoder scale at least once; detecting an interference signal based on the output beam, the interference signal including a heterodyne phase related to an optical path difference between the first beam and the second beam; and determining information about a degree of freedom of the encoder scale based on the heterodyne phase.

23 Claims, 18 Drawing Sheets

Related U.S. Application Data

(60) Provisional application No. 61/319,252, filed on Mar. 30, 2010, provisional application No. 61/327,983, filed on Apr. 26, 2010, provisional application No. 61/422,482, filed on Dec. 13, 2010.

(56) References Cited

U.S. PATENT DOCUMENTS

| | | | |
|---|---|---|---|
| 4,436,424 | A | 3/1984 | Bunkenburg |
| 4,512,661 | A | 4/1985 | Claus et al. |
| 4,629,886 | A | 12/1986 | Akiyama |
| 4,670,646 | A | 6/1987 | Spivey |
| 4,676,645 | A | 6/1987 | Taniguchi et al. |
| 4,682,893 | A | 7/1987 | Armandillo et al. |
| 4,728,193 | A | 3/1988 | Bartelt et al. |
| 4,930,895 | A | 6/1990 | Nishimura et al. |
| 4,979,826 | A | 12/1990 | Ishizuka et al. |
| 5,000,573 | A | 3/1991 | Suzuki et al. |
| 5,035,507 | A | 7/1991 | Nishioki et al. |
| 5,118,932 | A | 6/1992 | Brownrigg et al. |
| 5,341,213 | A | 8/1994 | Giroux |
| 5,430,546 | A | 7/1995 | Huber |
| 5,604,592 | A | 2/1997 | Kotidis et al. |
| 6,111,645 | A | 8/2000 | Tearney et al. |
| 6,407,815 | B2 | 6/2002 | Akihiro |
| 6,469,790 | B1 | 10/2002 | Manning |
| 6,483,593 | B1 | 11/2002 | Bell et al. |
| 6,744,520 | B2 | 6/2004 | Chang et al. |
| 6,819,425 | B2 | 11/2004 | Kwan |
| 6,839,141 | B2 | 1/2005 | Hill |
| 6,897,961 | B2 | 5/2005 | Muenter et al. |
| 7,019,842 | B2 | 3/2006 | Holzapfel et al. |
| 7,126,696 | B2 | 10/2006 | Tobiason |
| 7,154,609 | B2 | 12/2006 | Holzapfel et al. |
| 7,158,236 | B2 | 1/2007 | Schluchter |
| 7,193,204 | B2 | 3/2007 | Mitchell |
| 7,196,797 | B2 | 3/2007 | Bockman et al. |
| 7,224,466 | B2 | 5/2007 | Ray |
| 7,342,659 | B2 | 3/2008 | Horn et al. |
| 7,426,037 | B2 | 9/2008 | Ostrovsky et al. |
| 7,440,113 | B2 | 10/2008 | Trutna, Jr. et al. |
| 7,471,397 | B2 | 12/2008 | Holzapfel |
| 7,502,122 | B2 | 3/2009 | Tobiason et al. |
| 7,573,581 | B2 | 8/2009 | Holzapfel |
| 7,636,165 | B2 | 12/2009 | Klaver et al. |
| 2004/0061869 | A1 | 4/2004 | Hill |
| 2004/0227956 | A1 | 11/2004 | Kessler et al. |
| 2005/0068539 | A1 | 3/2005 | Tobiason |
| 2005/0259268 | A1 | 11/2005 | Schluchter |
| 2006/0066855 | A1 | 3/2006 | Boef et al. |
| 2007/0058172 | A1 | 3/2007 | Van Der Pasch et al. |
| 2009/0268210 | A1 | 10/2009 | Prince |

FOREIGN PATENT DOCUMENTS

| | | | |
|---|---|---|---|
| CN | 1699914 | 11/2005 | ............... G01B 9/02 |
| CN | 1702428 | 11/2005 | ............... G01B 9/02 |
| CN | 1702435 | 11/2005 | ............. G01D 5/353 |
| EP | 0 248 277 | 5/1987 | ............... G01D 5/38 |
| EP | 0 402 794 | 12/1990 | ............... G01B 9/02 |
| EP | 0 536 655 | 4/1993 | ............... G01B 9/02 |
| EP | 1 447 648 | 12/2004 | ............. G01D 5/347 |
| EP | 1 182 509 | 8/2009 | ............... G03F 7/20 |
| JP | 63-38102 | 2/1988 | ............. G01B 11/00 |
| JP | 5-126603 | 5/1993 | ............... G01D 5/38 |
| JP | 10-170217 | 6/1998 | ............... G01B 9/02 |
| JP | 1998 170217 | 6/1998 | |
| JP | 2003 294418 | 10/2003 | ............. G01B 11/02 |
| JP | 2005-338075 | 12/2005 | ............... G01B 9/02 |
| WO | WO 2004/001427 | 12/2003 | |

OTHER PUBLICATIONS

Giovannini et al., "Interferometric configuration based on a grating interferometer for the measurement of the phase between TE and TM polarizations after diffraction by gratings", *Optics Letters*, vol. 20, No. 21, pp. 2255-2257 (Nov. 1, 1995).

Kai et al., "Development of Alignment Technology for Segmented Grating", *IEEE Lasers and Electro-Optics*, 2005 Pacific Rim Conference, pp. 1172-1173 (Aug. 2005).

Lotem, "Littrow-mounted diffraction grating cavity", *Applied Optics*, vol. 33, No. 6, pp. 930-934 (Feb. 20, 1994).

M. Neviere et. al., "High accuracy translation rotation encoder with two gratings in a Littrow mount," Appl. Opt. 38, 67 (1999).

J. Partanen, "Multipass grating interferometer applied to line narrowing in excimer lasers," Appl. Opt. 25, pp. 3810-3815 (1986).

"A Primer on Displacement Measuring Interferometers", *Zygo OEM Better Technology, Better Metrology*, pp. 1-91 (Revised. Jan. 1999).

Chinese Office Action for Chinese Application No. 201180025887.4 dated Jul. 21, 2014 (19 pages).

Supplementary European Search Report for Application No. EP 11766307.0 dated Feb. 28, 2014 (10 pages).

Japanese Office Action for Application No. 2013-502574 dated Feb. 18, 2014 (6 pages).

International Search Report and Written Opinion dated Oct. 27, 2011, corresponding to International Appln. No. PCT/US2011/025039.

Chyan-Chyi Wu et al., "Optical heterodyne laser encoder with sub-nanometer resolution", Measurement Science and Technology 19, pp. 1-8 (2008).

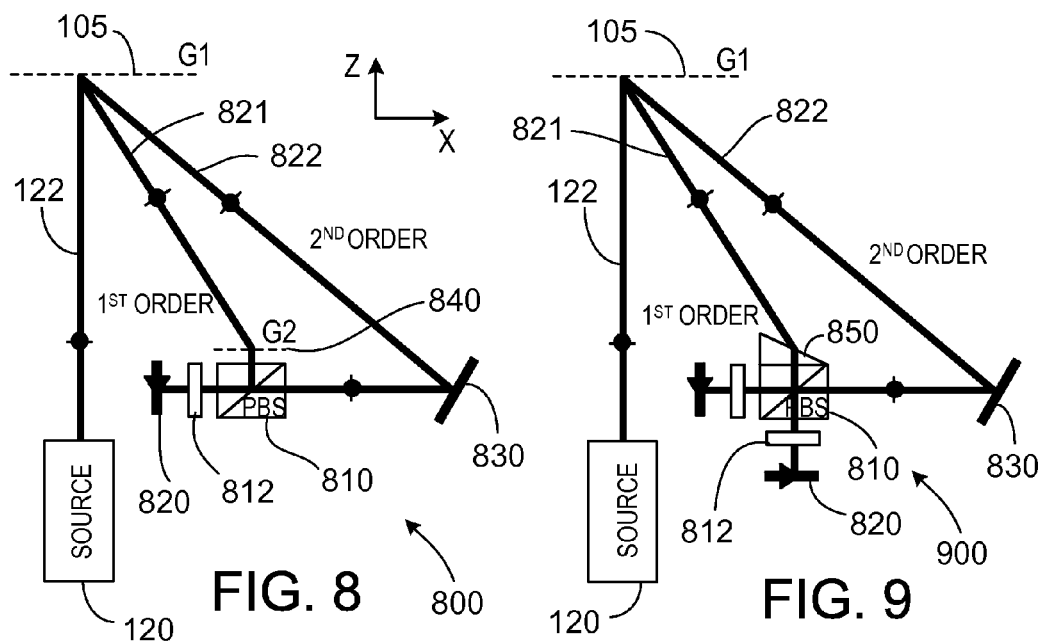
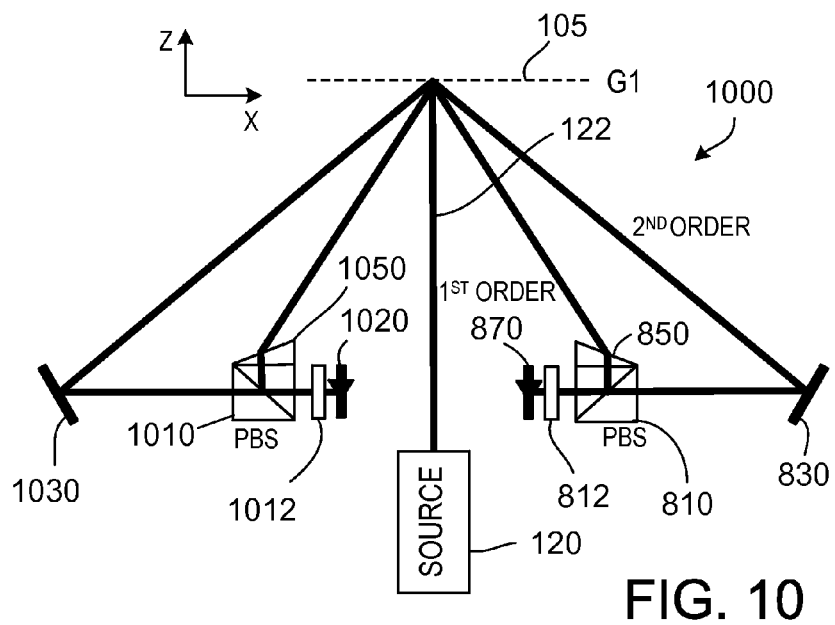

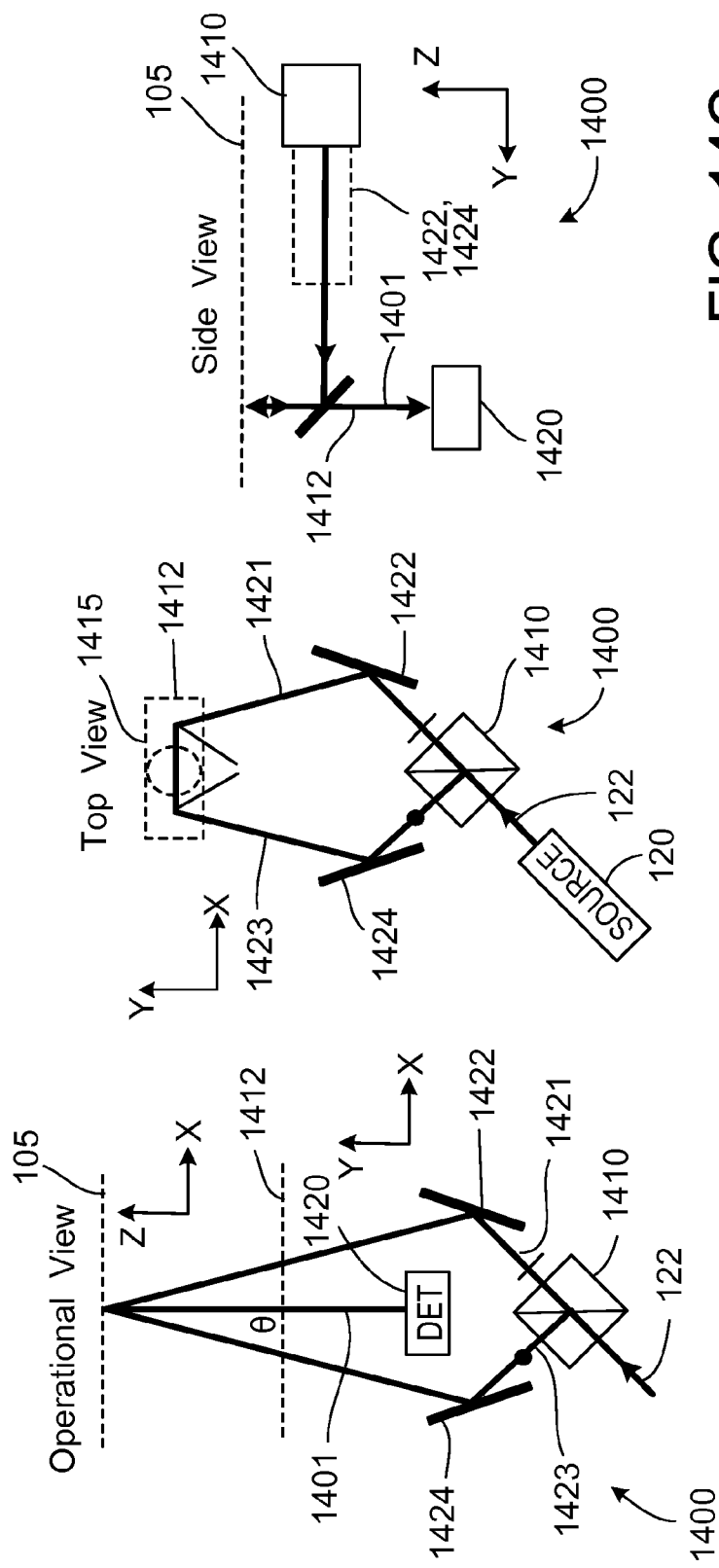

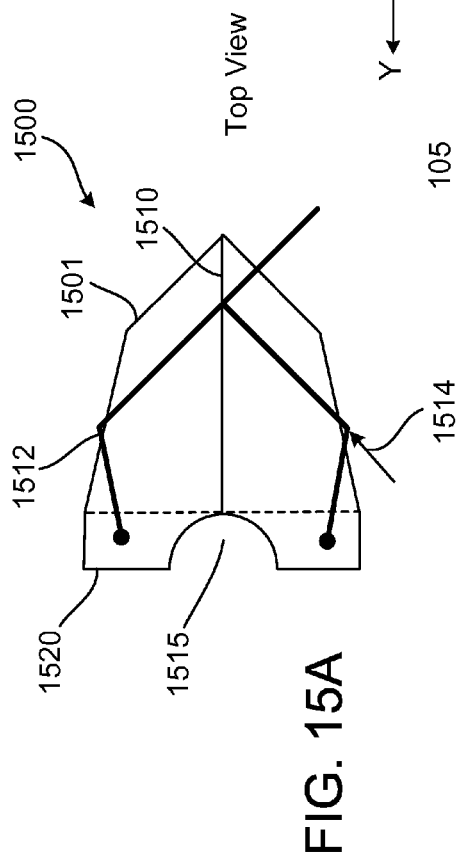
FIG. 15A
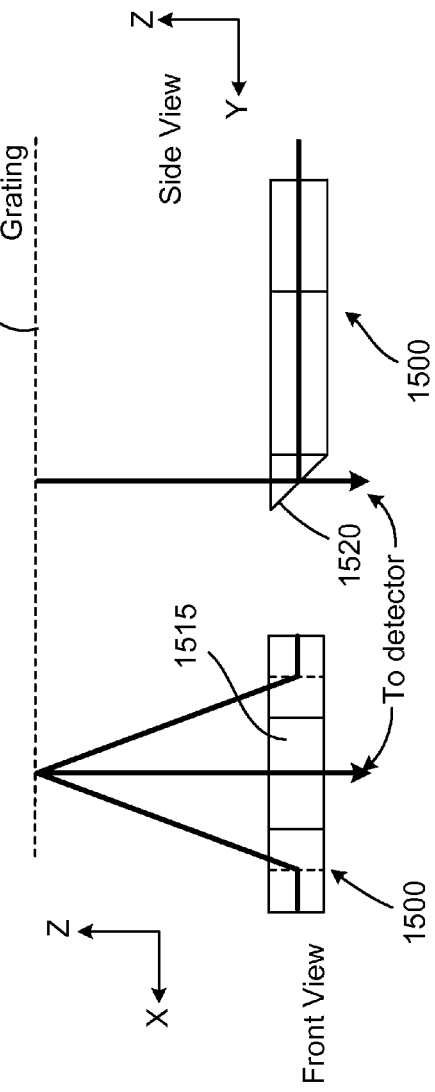
FIG. 15B
FIG. 15C

INTERFEROMETRIC ENCODER SYSTEMS

CROSS-REFERENCE TO RELATED APPLICATIONS

Pursuant to 35 U.S.C. §120, this application is a continuation of and claims the benefit of prior U.S. application Ser. No. 13/326,117, filed on Dec. 14, 2011, which is a continuation of and claims the benefit of prior U.S. application Ser. No. 13/028,787, filed Feb. 16, 2011, now U.S. Pat. No. 8,300,233, issued on Oct. 30, 2012, which claims the benefit under 35 U.S.C. §119(e) of prior U.S. Provisional Application No. 61/319,252, filed on Mar. 30, 2010, Provisional Application No. 61/327,983, filed on Apr. 26, 2010, and Provisional Application No. 61/422,482, filed on Dec. 13, 2010. The contents of each of these provisional applications are hereby incorporated by reference in their entirety.

BACKGROUND

The disclosure relates to interferometric encoder systems and methods, and applications for the encoder systems and methods.

In some cases, interferometric measuring systems monitor changes in the relative position of a measurement object based on an optical interference signal. For example, an interferometer generates the optical interference signal by overlapping and interfering a measurement beam reflected from the measurement object with a second beam, sometimes called a "reference beam," where the measurement beam and the reference beam are derived from a common source. Changes in the relative position of the measurement object correspond to changes in the phase of the measured optical interference signal.

An example of such interferometric measuring systems are interferometric encoder systems, which evaluate the motion of an object by tracking a measuring graduation, called the encoder scale. Typically, an interferometric encoder system includes the encoder scale and an encoder head. The encoder head is an assembly that includes an interferometer. The interferometer directs a measurement beam to the encoder scale, where it diffracts. The interferometer combines the diffracted measurement beam with a reference beam to form an output beam that includes a phase related to the position of the object. Encoder systems are used extensively in lithographic applications for monitoring the motion of moveable stages in a lithography tool. Encoder systems can be advantageous in such applications due to their relative insensitivity to atmospheric turbulence.

SUMMARY

The disclosure relates to encoder systems and methods to implement a heterodyne measurement of phase changes occurring in reflected or transmitted beams diffracted from encoder scales resulting from the motion of the encoder scale in specific measurement directions. The encoder systems may be arranged to generate an interferometric signal based on a diffracted measurement beam in a non-Littrow configuration. The encoder systems can include compact encoder heads and offer multiple measurement channels.

In certain aspects, the disclosure features an encoder system capable of measuring accurately changes in one or more displacement directions of an encoder scale including: (1) a source beam of a frequency stabilized illumination with two linear orthogonally polarized components with different frequencies; (2) means (e.g., an optical assembly), for directing one or both components onto a encoder scale attached to the body to be monitored; (3) means (e.g., an optical assembly), for receiving one or both components of the diffracted beams; (4) means (e.g., an optical assembly), for combining and mixing both frequency components to produce a heterodyne signal; (5) means (e.g., a detector module including a photoelectric detector) for producing an electrical measurement signal; and (6) means (e.g., a phase meter/accumulator) for indicating the measured phase, the measured phase being related to the encoder scale's diffractive structure and the displacement of the encoder scale along the sensitive directions. Embodiments can include one or more of the following features. For example, embodiments may be designed so they do not operate at Littrow, to operate with a heterodyne laser source and detection means, may be first-order insensitive to tip and tilt of the encoder scale, may provide a minimum of two axis of metrology (e.g., X and Z, Y and Z), and/or can function with 2D encoder scales to provide full 3D motion detection if desired. The encoder systems can be used in lithography tools, but could be used for other applications too.

Various aspects of the invention are summarized as follows.

In general, in a first aspect, the invention features methods for determining information about changes along a degree of freedom of an encoder scale, the methods including: directing a first beam and a second beam along different paths and combining the first and second beams to form an output beam, where the first and second beams are derived from a common source, the first and second beams have different frequencies, where the first beam contacts the encoder scale at a non-Littrow angle and the first beam diffracts from the encoder scale at least once; detecting an interference signal based on the output beam, the interference signal including a heterodyne phase related to an optical path difference between the first beam and the second beam; and determining information about a degree of freedom of the encoder scale based on the heterodyne phase.

Implementations of the methods can include one or more of the following features. For example, the first beam can be normally incident on the encoder scale. The first beam can be non-normally incident on the encoder scale. The first beam can be incident on the encoder scale at an angle so that the diffracted measurement beam is normal to the encoder scale.

The degree of freedom can be a position of the encoder scale along an axis that lies in the plane of the encoder scale.

The first and second beams can be linearly polarized beams. The path of the first beam before and after diffracting from the encoder scale can define a plane and the first beam can be polarized orthogonal to the plane. In some embodiments, the encoder scale can include grating lines that extend along a first direction and the measurement beam is linearly polarized in a direction parallel to grating lines. Directing the first and second beams can include rotating a polarization state of the first beam by 90° prior to diffraction from the encoder scale.

In certain embodiments, the first and second beams are orthogonally polarized beams. Detecting the interference signal can include directing the output beam through a polarizing element that transmits a component of each of the orthogonally polarized first and second beams.

Directing the first and second beams along different paths can include deriving the first and second beams from an input beam using a beam splitter. The first and second beams can be combined using the beam splitter. In some embodiments, the first and second beams are combined using a second beam splitter. The beam splitter can be a polarizing beam splitter.

In some embodiments, the second beam does not contact the encoder scale. Alternatively, the second beam can diffract from the encoder scale at least once. The diffracted second beam can be a zero-order diffracted beam. The diffracted second beam can be co-linear with the first beam at the encoder scale.

The first beam can diffract from the encoder scale only once. Alternatively, in some embodiments, the first beam diffracts from the encoder scale more than once (e.g., twice). A path of the first beam prior to diffracting from the encoder scale can be parallel to a path of the first beam after diffracting from the encoder scale a second time. After diffracting from the encoder scale a first time, the first beam can be directed by a retroreflector to diffract from the encoder scale a second time prior to being combined with the second beam.

The information can be derived based on more than one heterodyne phase measurements.

The method can further include combining a third beam and a fourth beam to form a second output beam, the third and fourth beams being derived from the common source and the third beam diffracts from the encoder scale at least once; and detecting a second interference signal based on the second output beam, the second interference signal comprising a heterodyne phase related to an optical path difference between the third beam and the fourth beam. The first and third beams can contact the encoder scale at the same location. Alternatively, or additionally, the first and second beams can contact the encoder scale at different locations. The information can be determined based on the heterodyne phases of the first and second output beams. The once-diffracted measurement beam and the third beam can be the +1 and −1 diffracted orders of the measurement beam, respectively.

The degree of freedom can correspond to a displacement of the encoder scale along a first axis in a plane of the encoder scale. The method can include determining information about a second degree of freedom of the encoder scale. The second degree of freedom can be a displacement of the encoder scale along a second axis orthogonal to the first axis. The second axis can be in the plane of the encoder scale. The second axis can be orthogonal to the plane of the encoder scale.

The degree of freedom can be a tilt of the encoder scale about an axis.

The method can include monitoring a reference phase of an input beam produced by the common source and from which the first beam is derived. Determining the information can include comparing the heterodyne phase to the reference phase.

The first beam can have a wavelength in a range from 400 nm to 1,500 nm. In some embodiments, the first beam has a wavelength of about 633 nm or about 980 nm.

The encoder scale can include a grating. The grating can have a pitch in a range from about $1\lambda$ to about $20\lambda$, where $\lambda$ is a wavelength of the first beam. In some embodiments, the grating has a pitch in a range from about 1 µm to about 10 µm.

The first and second beams can be directed along their respective paths using an optical assembly and the method further comprises translating the encoder scale relative to the optical assembly while determining the information. The optical assembly or encoder scale can be attached to a wafer stage and the method further includes monitoring the position of a wafer relative to radiation from a lithography system based on the information. The optical assembly or encoder scale can be attached to a reticle stage and the method further includes monitoring the position of a reticle relative to radiation from a lithography system based on the information.

In general, in another aspect, the invention features encoder systems that include: an optical assembly configured to derive a first beam and a second beam from an input beam, direct the first and second beams along different paths and combining the first and second beams to form an output beam, where the first and second beams have different frequencies; a diffractive encoder scale positioned in the path of the first beam so that the first beam contacts the diffractive encoder scale at a non-Littrow angle and the first beam diffracts from the diffractive encoder scale at least once; a detector positioned to detect the output beam; and an electronic processor configured to receive an interference signal from the detector, the interference signal including a heterodyne phase related to an optical path difference between the first and second beams, and determine the information about a degree of freedom of the encoder scale based on the heterodyne phase.

Embodiments of the encoder system can include one or more of the following features and/or features of other aspects. For example, the optical assembly can include an optical element that splits the input beam into the first and second beams. The optical element can be a non-polarizing beam splitter or a polarizing beam splitter. The optical element can combine the first and second beams to form the output beam.

The optical assembly can include one or more optical elements configured to split the input beam into two parallel sub-input beams prior to deriving the first and second beams. The optical assembly can include a beam splitter configured to split one of the sub-input beams into the first and second beams and the split the other sub-input beam into a third and fourth beam, wherein the optical assembly directs the third and fourth beams along different paths and combines the third and fourth beams to form a second output beam. The optical assembly can direct the third beam to diffract from the encoder scale at least once. The optical assembly can include two retroreflectors positioned to reflect the once-diffracted first and third beams, respectively, to diffract from the encoder scale a second time. The first and third beams contact the encoder scale at different locations. The encoder scale can diffract the first and third beams into the +1 and −1 diffraction orders, respectively. The path of the input beam at the optical assembly can be parallel to paths of the first and second output beams. The path of the input and first and second output beams can be parallel to a plane of the encoder scale.

The optical assembly can include a half wave plate in the path of the first beam.

The encoder scale can include a grating (e.g., a one-dimensional or a two-dimensional encoder scale).

In a further aspect, the invention features systems that include a moveable stage; and the encoder system of the foregoing aspect, wherein either the encoder scale or the optical assembly are attached to the stage.

In general, in another aspect, the invention features encoder systems that include a means for deriving a first beam and a second beam from an input beam where the first and second beams have different frequencies; a means for directing the first and second beams along different paths; a means for combining the first and second beams to form an output beam; a diffractive encoder scale positioned in the path of the first beam so that the first beam contacts the diffractive encoder scale at a non-Littrow angle and the first beam diffracts from the diffractive encoder scale at least once; a means for detecting the output beam; and a means for receiving an interference signal from the detector, the interference signal comprising a heterodyne phase related to an optical path difference between the first and second beams, and determine the information about a degree of freedom of the encoder scale based on the heterodyne phase.

Embodiments of the encoder system can include one or more features of other aspects.

In general, in a further aspect, the invention features encoder systems that include an optical assembly configured to derive a first beam and a second beam from an input beam, wherein the first and second beams are linearly polarized beams having different frequencies, the optical assembly being further configured to direct the first and second beams along different paths and combine the first and second beams to form an output beam, the optical assembly including an optical element positioned in the path of the first beam and configured to rotate the linear polarization state of the first beam by 90°; a diffractive encoder scale positioned in the path of the first beam so that the first beam diffracts from the diffractive encoder scale at least once; a detector positioned to detect the output beam; and an electronic processor configured to receive an interference signal from the detector, the interference signal including a heterodyne phase related to an optical path difference between the first and second beams, and determine the information about a degree of freedom of the encoder scale based on the heterodyne phase.

Embodiments of the encoder system can include one or more of the following features and/or features of other aspects. For example, the optical element can intersect the path of the first beam twice and rotates the linear polarization state of the first beam by 90° each time. The optical element can be a half wave plate. The first beam can diffract from the encoder scale twice. The first beam can be p-polarized at the encoder scale.

In general, in another aspect, the invention features encoder systems that include a polarizing beam splitting element configured to reflect a first beam in a first direction and transmit a second beam in a second direction orthogonal to the first direction and combine the first and second beams to form an output beam which exits the polarizing beam splitting element along a path parallel to the second direction, wherein the first and second beams have different frequencies and are derived from a common source; a diffractive encoder scale positioned in the path of the first beam so that the first beam diffracts from the diffractive encoder scale at least once; a detector positioned to detect the output beam; and an electronic processor configured to receive an interference signal from the detector, the interference signal including a heterodyne phase related to an optical path difference between the first and second beams, and determine the information about a degree of freedom of the encoder scale based on the heterodyne phase.

Embodiments of the encoder system can include one or more of the following features and/or features of other aspects. For example, the diffractive encoder scale can be oriented orthogonal to the first direction. The first beam can be normally incident on the diffractive encoder scale.

In general, in another aspect, the invention features methods for determining information about changes along a degree of freedom of a grating relative to an optical assembly, the methods including: using an optical assembly to combine a first beam with a second beam to form an output beam, where the first beam is diffracted from a grating moveable with respect to the optical assembly, the first and second beams are derived from a common source and the first beam is a non-zero diffracted order of a primary beam derived from the common source that impinges on the grating, the first beam being non-co-linear with the primary beam at the grating; detecting an interference signal based on the output beam, the interference signal comprising a heterodyne phase related to an optical path difference between the first beam and the second beam; and determining information about changes along a degree of freedom of the grating relative to the optical assembly based on the heterodyne phase.

Implementations of the methods can include one or more of the following features and/or features of other aspects. For example, the primary beam can be normally or non-normally incident on the grating.

The primary beam can be a linearly polarized beam. The primary beam can be linearly polarized in a direction parallel to grating lines of the grating prior to impinging on the grating.

The first and second beams can be polarized beams. The first beam can be polarized orthogonal to the second beam. The first and second beams can be linearly polarized beams.

In some embodiments, the second beam does not contact the grating. Alternatively, in certain embodiments, the second beam diffracts from the grating at least once. The second beam can be a zero-order diffracted beam. The second beam can be co-linear with the primary beam at the grating. The second beam can be a diffracted order of the primary beam. The second beam can be the zeroth diffracted order of the primary beam. The first beam can be a first diffracted order of the primary beam.

In some embodiments, the methods include combining a third beam and a fourth beam to form a second output beam, the third and fourth beams being derived from the common source; and detecting a second interference signal based on the second output beam, the second interference signal comprising a heterodyne phase related to an optical path difference between the third beam and the fourth beam, wherein the third beam is a beam diffracted from the grating, different from the first beam. The first beam and the third beam can be the +1 and −1 diffracted orders of the primary beam, respectively. The second and fourth beams can be derived from zeroth diffracted order of the primary beam.

The degree of freedom can correspond to a displacement of the grating along a first axis in a plane of the grating. The grating can include grating lines extending along the first direction orthogonal to the first axis. The method can include determining information about a second degree of freedom of the grating relative to the optical assembly. The second degree of freedom can be a displacement of the grating along a second axis orthogonal to the first axis. The second axis can be in the place of the grating. Alternatively, the second axis can be orthogonal to the plane of the grating.

The degree of freedom can correspond to a displacement of the grating along an axis orthogonal to a plane of the grating.

The degree of freedom can be a tilt of the grating relative to the optical assembly.

The methods can include monitoring a reference phase of an input beam produced by the common source and from which the primary beam is derived. Determining the information can include comparing the heterodyne phase to the reference phase.

The first beam can be twice diffracted from the grating prior to being combined with the second beam. The first beam can be directed by a retroreflector to impinge on the grating at least once prior to being combined with the second beam.

The first and second beams can be different non-zeroth diffracted orders of the primary beam.

The primary beam can include a first component and a second component, the first and second components having different frequencies that define a heterodyne frequency and different orthogonal polarization states. The primary beam can have a wavelength in a range from 400 nm to 1,500 nm. For example, the primary beam can have a wavelength of about 633 nm or about 980 nm.

The grating can have a pitch in a range from about 1λ to about 20λ, where λ is a wavelength of the primary beam. The grating can have a pitch in a range from about 1 μm to about 10 μm.

The methods can include translating the grating relative to the optical assembly while determining the information. The optical assembly or grating can be attached to a wafer stage and the method further includes monitoring the position of a wafer relative to radiation from a lithography system based on the information. In some embodiments, the optical assembly or grating are attached to a reticle stage and the method further includes monitoring the position of a reticle relative to radiation from a lithography system based on the information In general, in another aspect, the invention features systems for determining information about changes along a degree of freedom of a grating relative to an optical assembly, the systems including: a light source configured to provide an input beam comprising a first component and a second component, the first and second components having different frequencies and orthogonal polarization states; the optical assembly configured to derive a primary beam from the input beam and direct the primary beam to a grating, receive a first beam diffracted from the grating at a non-zero order and combine it with a second beam to form an output beam, where the primary beam comprises the first component of the input beam, the first beam is a diffracted order of the primary beam, the first beam being non-co-linear with the primary beam at the grating, the second beam comprises the second component of the input beam, and the grating is moveable with respect to the optical assembly; a detector positioned to detect the output beam; and an electronic processor configured to receive an interference signal from the detector, the interference signal comprising a heterodyne phase related to an optical path difference between the first beam and the second beam, and determine the information about the changes along the degree of freedom of the grating relative to the optical assembly based on the heterodyne phase.

Embodiments of the systems can include one or more of the following features and/or features of other aspects. For example, the system can include a moveable stage and the grating is attached to the moveable stage.

The optical assembly can include a second grating positioned in the path of the first beam. The second grating can be configured to redirect the first beam along a path parallel to a path of the primary beam. The optical assembly can include a retroreflector positioned in the path of the first beam to direct the first beam to contact the grating a second time. The optical assembly can include a polarizing beam splitter configured to derive the primary beam and second beam from the input beam. The optical assembly can include a polarizing beam splitter configured to combine the first and second beams to form the output beam. The optical assembly can be configured to direct the second beam to contact the grating.

In general, in another aspect, the invention features methods for determining information about changes along a degree of freedom of a grating relative to an optical assembly, the methods including: using an optical assembly to combine a first beam with a second beam to form an output beam, where the first beam is diffracted from a grating moveable with respect to the optical assembly, the first and second beams are derived from a common source and the first beam is a non-zero diffracted order of a primary beam derived from the common source that impinges on the grating, the first beam being non-co-linear with the primary beam at the grating; detecting an interference signal based on the output beam, the interference signal comprising a phase related to an optical path difference between the first beam and the second beam; and determining information about changes along a degree of freedom of the grating relative to the optical assembly based on the phase, wherein the phase is insensitive to first order to tip and/or tilt of the grating with respect to the optical assembly.

Implementations of the methods can include one or more of the following features and/or features of other aspects. For example, the phase can be a heterodyne phase. The information can include information about changes along at least two degrees of freedom of the grating relative to the optical assembly. The at least two degrees of freedom can include a displacement along an axis in a plane of the grating. The at least two degrees of freedom can include a displacement along an axis orthogonal to the plane of the grating.

In general, in another aspect, the invention features systems for monitoring a displacement of a grating along an axis, the systems including: a light source for providing illumination with two linearly polarized components with different frequencies; a means for directing one or both components onto the grating; a means for receiving one or both components diffracted from the grating; a means for combining and mixing both frequency components; a means for detecting the combined and mixed components; and a means for measuring a phase related to the detected components, wherein one or both of the components do not satisfy the Littrow condition at the grating. Embodiments of the system can include one or more features of other aspects.

Embodiments of aforementioned aspects can include one or more of the following features. For example, the optical assembly can include a fold mirror arranged to direct the primary beam towards the grating. The fold mirror can direct the second beam towards the grating. The assembly can include a polarizing beam splitter arranged to split the input beam into the primary beam and the second beam, wherein the primary and second beams lie within a first plane immediately after the beam splitter, and the fold mirror is arranged to direct the primary and second beams in a direction orthogonal to the first plane. The primary and second beams can contact the grating at a common location. The primary and second beams can contact the grating at the same incident angle but from opposite sides of a normal to the grating. The first beam can be co-linear to a diffracted order of the second beam. The optical assembly can include a first mirror and a second mirror configured to respectively reflect the primary and second beam towards the common location. The beam splitter, fold mirror and first and second mirrors may all be interfaces of a monolithic optical element. The monolithic optical element can have a maximum dimension orthogonal to the first plane smaller than a maximum dimension of the monolithic optical element in the first plane, e.g., the maximum dimension orthogonal to the first plane can be 0.5 times or less (e.g., 0.3 times or less, 0.2 or less, 0.1 times or less, 0.05 times or less) the maximum dimension in the first plane. The maximum dimension of the monolithic optical assembly orthogonal to the first plane can be 5 cm or less (e.g., 4 cm or less, 3 cm or less, 2 cm or less, 1 cm or less).

In another aspect, the invention features lithography methods for use in fabricating integrated circuits on a substrate, the methods including supporting the substrate on a moveable stage, imaging spatially patterned radiation onto the substrate, adjusting the position of the stage, using the method or system of other aspects to monitor the position of the stage, where the grating or the optical assembly are attached to the stage and the information corresponds to the position of the stage along an axis.

In another aspect, the invention features lithography methods for fabricating integrated circuits on a substrate including positioning a first component of a lithography system relative to a second component of a lithography system to expose the substrate to spatially patterned radiation and monitoring the position of the first component using the method or system of other aspects, where the grating or the optical assembly are attached to the first component and the information corresponds to the position of the first component.

In another aspect, the invention features lithography systems for use in fabricating integrated circuits on a wafer, the systems including a projection lens for imaging spatially patterned radiation onto the wafer, the system of another aspect configured to monitor the position of the wafer relative to the imaged radiation, and a positioning system for adjusting the position of the stage relative to the imaged radiation, wherein the wafer is supported by the stage.

In another aspect, the invention features lithography systems for use in fabricating integrated circuits on a wafer, the systems including an illumination system including a radiation source, a mask, a positioning system, a projection lens, and the system of another aspect, where during operation the source directs radiation through the mask to produce spatially patterned radiation, the positioning system adjusts the position of the mask relative to the radiation from the source, the projection lens images the spatially patterned radiation onto the wafer supported by the stage, and the system monitors the position of the mask relative to the radiation from the source.

Various references are incorporated herein by reference. In the event of conflict, the present specification controls.

The details of one or more embodiments are set forth in the accompanying drawings and the description below. Other features and advantages will be apparent from the description and drawings, and from the claims.

DESCRIPTION OF DRAWINGS

FIG. 8 is a schematic diagram of a portion of another embodiment of an encoder system.

FIG. 9 is a schematic diagram of a portion of another embodiment of an encoder system.

FIG. 10 is a schematic diagram of a portion of another embodiment of an encoder system.

FIGS. 14A, 14B, and 14C are schematic diagrams of another embodiment of an encoder system. FIG. 14A shows an operational view of the encoder system, FIG. 14B shows a top view, and FIG. 14C shows a side view.

FIGS. 15A, 15B, and 15C are schematic diagrams of another embodiment of components of an encoder system. FIG. 15A shows a top view of the components, FIG. 15B shows a front view, and FIG. 15C shows a side view.

Like reference symbols in the various drawings indicate like elements.

DETAILED DESCRIPTION

Figure 1:
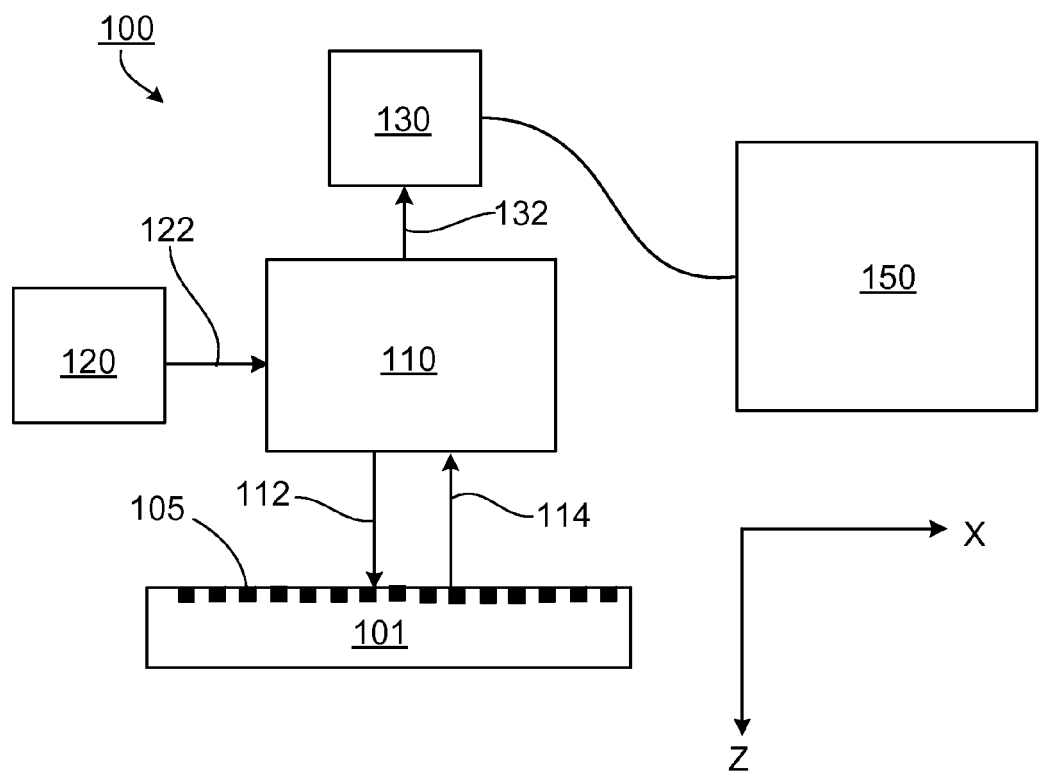
FIG. 1 is a schematic diagram of an embodiment of an encoder system.

Referring to FIG. 1, an interferometric encoder system 100 includes a light source module 120 (e.g., including a laser), an optical assembly 110, a measurement object 101, a detector module 130 (e.g., including a polarizer and a detector), and an electronic processor 150. Generally, light source module 120 includes a light source and can also include other components such as beam shaping optics (e.g., light collimating optics), light guiding components (e.g., fiber optic waveguides) and/or polarization management optics (e.g., polarizers and/or wave plates). Various embodiments of optical assembly 110 are described below. The optical assembly is also referred to as the "encoder head." A Cartesian coordinate system is shown for reference.

Measurement object 101 is positioned some nominal distance from optical assembly 110 along the Z-axis. In many applications, such as where the encoder system is used to monitor the position of a wafer stage or reticle stage in a lithography tool, measurement object 101 is moved relative to the optical assembly in the X- and/or Y-directions while remaining nominally a constant distance from the optical assembly relative to the Z-axis. This constant distance can be relatively small (e.g., a few centimeters or less). However, in such applications, the location of measurement object typically will vary a small amount from the nominally constant distance and the relative orientation of the measurement object within the Cartesian coordinate system can vary by small amounts too. During operation, encoder system 100 monitors one or more of these degrees of freedom of measurement object 101 with respect to optical assembly 110, including a position of measurement object 101 with respect to the x-axis, and further including, in certain embodiments, a position of the measurement object 101 with respect to the y-axis and/or z-axis and/or with respect to pitch and yaw angular orientations.

To monitor the position of measurement object 101, source module 120 directs an input beam 122 to optical assembly 110. Optical assembly 110 derives a measurement beam 112 from input beam 122 and directs measurement beam 112 to measurement object 101. Optical assembly 110 also derives a reference beam (not shown) from input beam 122 and directs the reference beam along a path different from the measurement beam. For example, optical assembly 110 can include a beam splitter that splits input beam 122 into measurement beam 112 and the reference beam. The measurement and reference beams can have orthogonal polarizations (e.g., orthogonal linear polarizations).

Measurement object 101 includes an encoder scale 105, which is a measuring graduation that diffracts the measurement beam from the encoder head into one or more diffracted orders. In general, encoder scales can include a variety of different diffractive structures such as gratings or holographic diffractive structures. Examples or gratings include sinusoidal, rectangular, or saw-tooth gratings. Gratings can be characterized by a periodic structure having a constant pitch, but also by more complex periodic structures (e.g., chirped gratings). In general, the encoder scale can diffract the measurement beam into more than one plane. For example, the encoder scale can be a two-dimensional grating that diffracts the measurement beam into diffracted orders in the X-Z and Y-Z planes. The encoder scale extends in the X-Y plane over distances that correspond to the range of the motion of measurement object 110.

In the present embodiment, encoder scale 105 is a grating having grating lines that extend orthogonal to the plane of the page, parallel to the Y-axis of the Cartesian coordinate system shown in FIG. 1. The grating lines are periodic along the X-axis. Encoder scale 105 has a grating plane corresponding to the X-Y plane and the encoder scale diffracts measurement beam 112 into one or more diffracted orders in the Y-Z plane.

At least one of these diffracted orders of the measurement beam (labeled beam 114), returns to optical assembly 110, where it is combined with the reference beam to form an output beam 132. For example, the once-diffracted measurement beam 114 can be the first-order diffracted beam.

Output beam 132 includes phase information related to the optical path length difference between the measurement beam and the reference beam. Optical assembly 110 directs output beam 132 to detector module 130 that detects the output beam and sends a signal to electronic processor 150 in response to the detected output beam. Electronic processor 150 receives and analyzes the signal and determines information about one or more degrees of freedom of measurement object 101 relative to optical assembly 110.

In certain embodiments, the measurement and reference beams have a small difference in frequency (e.g., a difference in the kHz to MHz range) to produce an interferometry signal of interest at a frequency generally corresponding to this frequency difference. This frequency is hereinafter referred to interchangeably as the "heterodyne" frequency or the "reference" frequency, and is denoted as $\omega_R$ (with respect to angular frequency). Information about the changes in the relative position of the measurement object generally corresponds to a phase of the interferometry signal at this heterodyne frequency. Signal processing techniques can be used to extract this phase. In general, the moveable measurement object causes this phase term to be time-varying. In this regard, the first order time derivative of the measurement object movement causes the frequency of the interferometry signal to shift from the heterodyne frequency by an amount referred to herein as the "Doppler" shift.

The different frequencies of the measurement and reference beams can be produced, for example, by laser Zeeman splitting, by acousto-optical modulation, using two different laser modes, or internal to the laser using birefringent elements, among other techniques. The orthogonal polarizations allow a polarizing beam-splitter to direct the measurement and reference beams along different paths, and combine them to form the output beam that subsequently passes through a polarizer, which mixes the orthogonally polarized components so they can interfere. In the absence of target motion the interference signal oscillates at the heterodyne frequency, which is just the difference in the optical frequencies of the two components. In the presence of motion the heterodyne frequency incurs a change related to the velocity of the target through well-known Doppler relations. Accordingly, monitoring changes in the heterodyne frequency allows one to monitor motion of the target relative to the optical assembly.

In the embodiments described below, the "input beam" generally, refers to the beam emitted by the light source module. For heterodyne detection, the input beam includes components having slightly different frequencies, as discussed above.

In general, the measurement beam is incident on measurement object 101 at an incident angle such that the once-diffracted measurement beam does not satisfy the Littrow condition. The Littrow condition refers to an orientation of a diffractive structure, such as a grating, with respect to an incident beam where the diffractive structure directs the diffracted beam back towards the source. In other words, in encoder system 100, the once-diffracted measurement beam is non-co-linear with the measurement beam prior to diffracting at the encoder scale.

While encoder scale 105 is depicted in FIG. 1 as a structure that is periodic in one direction, more generally, the measurement object can include a variety of different diffractive structures that appropriately diffract the measurement beam. In some embodiments, the measurement object can include a diffractive structure (e.g., a encoder scale) that is periodic in two directions (e.g., along the x- and y-axis), diffracting the measurement beam into beams in two orthogonal planes. In general, the diffractive structure of the encoder scale and source module are selected so that the encoder system provides one or more diffracted measurement beams having sufficient intensity to establish one or more detectable interference signals when combined with corresponding reference beams, within the geometrical constraints for the system. In some embodiments, the source module provides an input beam having a wavelength in a range from 400 nm to 1,500 nm. For example, the input beam can have a wavelength of about 633 nm or about 980 nm. Note that, in general, the frequency splitting of the heterodyne source results in only a very small difference between the wavelength of the two components of the input beam, so even though the input beam is not strictly monochromatic it remains practical to characterize the input beam by a single wavelength. In some embodiments, the source module can include a gas laser (e.g., a HeNe laser), a laser diode or other solid-state laser source, a light-emitting diode, or a thermal source such as a halogen light with or without a filter to modify the spectral bandwidth.

In general, the diffractive structure (e.g., grating pitch) can vary depending on the wavelength of the input beam and the arrangement of optical assembly and diffracted orders used for the measurement. In some embodiments, the diffractive structure is a grating having a pitch in a range from about $1\lambda$ to about $20\lambda$, where $\lambda$ is a wavelength of the source. The grating can have a pitch in a range from about 1 µm to about 10 µm.

Turning now to various implementations of encoder systems, in some embodiments, encoder systems are arranged so that the measurement beam makes a single pass to the encoder scale and a single diffracted order of the measurement beam is used for the measurement. For example, referring to FIG. 2A, an optical assembly 110 of an encoder system 200 includes a first polarizing beam splitter (PBS) 210, a second PBS 220, and a grating 211. Detector module 130 includes a polarizer 231 and a detector 230. PBS 210 splits input beam 122 into measurement beam 112 and a reference beam 113. As shown, measurement beam 112 is polarized in the plane of the figure (p-polarization), while secondary beam 113 is polarized orthogonal to the plane of the figure (s-polarization). Measurement beam 112 is diffracted by encoder scale 105, providing a once-diffracted measurement beam 114 that corresponds to a non-zeroth diffracted order (e.g., first order or second order) of measurement beam 112. Grating 211, which can have a diffractive structure similar to encoder scale 105 (e.g., the same pitch) diffracts once-diffracted measurement beam 114 so that the now twice-diffracted measurement beam is incident on PBS 220 along a path parallel to the path of undiffracted measurement beam 112. PBS 220 combines twice-diffracted measurement beam 114 with reference beam 113 to form output beam 132. At detector module 130, polarizer 231 mixes the measurement and reference beam components of the output beam before the output beam is incident on detector 230. This can be achieved, for example, by orienting the transmission axis of polarizer 231 so that it transmits a component of s-polarized light and a component of p-polarized light (e.g., by orienting the transmission axis at 45° with respect to the plane of the page).

Encoder system 200 is an example of an encoder system that has a single detection channel, where the measurement beam makes a single pass to the measurement object. Here, the phase measured at detector 230 will vary depending on motion of encoder scale 105 in the X-direction and the Z-direction. Variations of this system are possible. For example, in some embodiments, measurement beam 114 can include both frequency and polarization components. For example, referring to FIG. 2B, a non-polarizing beam splitter (NPBS) 212 can be used to split the input beam into the measurement beam and the reference beam so that both contain both s- and p-polarized light. However, once-diffracted measurement beam 114 and reference beam 113 are combined using PBS 220 so that the only portion of once-diffracted measurement beam 114 in output beam 132 corresponds to the component polarized in one state (in this case, p-polarized light), and the only portion of reference beam 113 in output beam 132 corresponds to the component having the orthogonal polarization (here, s-polarized light).

Figure 2A:
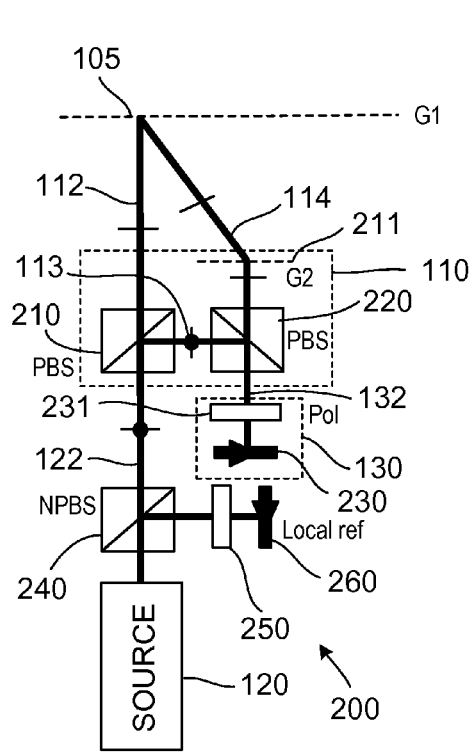
FIG. 2A is a schematic diagram of a portion of an embodiment of an encoder system.
Figure 2B:
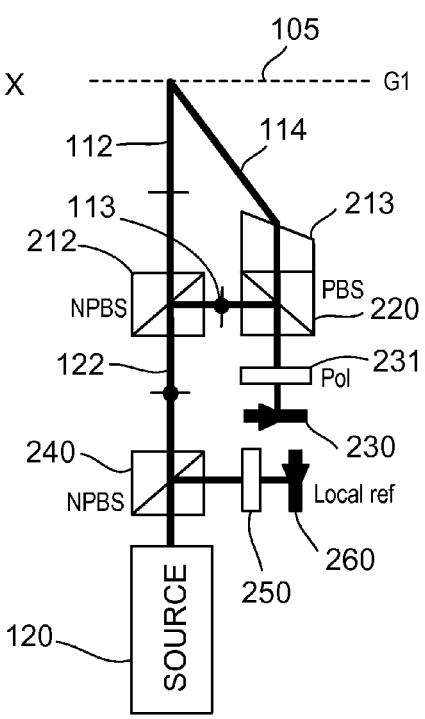
FIG. 2B is a schematic diagram of a portion of another embodiment of an encoder system.

Furthermore, in general, the optical assembly for encoder system 200 can include one or more components in addition, or as alternative, to those components shown in FIG. 2A. For example, in some embodiments, diffracted beam 114 can be redirected to PBS 220 using a refractive component 213 (e.g., a prism or other refractive optical element) instead of grating 211. Such an embodiment is shown in FIG. 2B.

In certain embodiments, the encoder system includes additional subsystems. For example, in some embodiments, encoder system 200 includes a local reference which monitors a phase of input beam 122. As depicted in FIG. 2A, a local reference can be provided using a beam splitter 240 (e.g., a NPBS), polarizer 250, and a detector 260. Such a reference can be useful, for example, in embodiments where the relative starting phase between the components of input beam 122 is variable.

Figure 3:
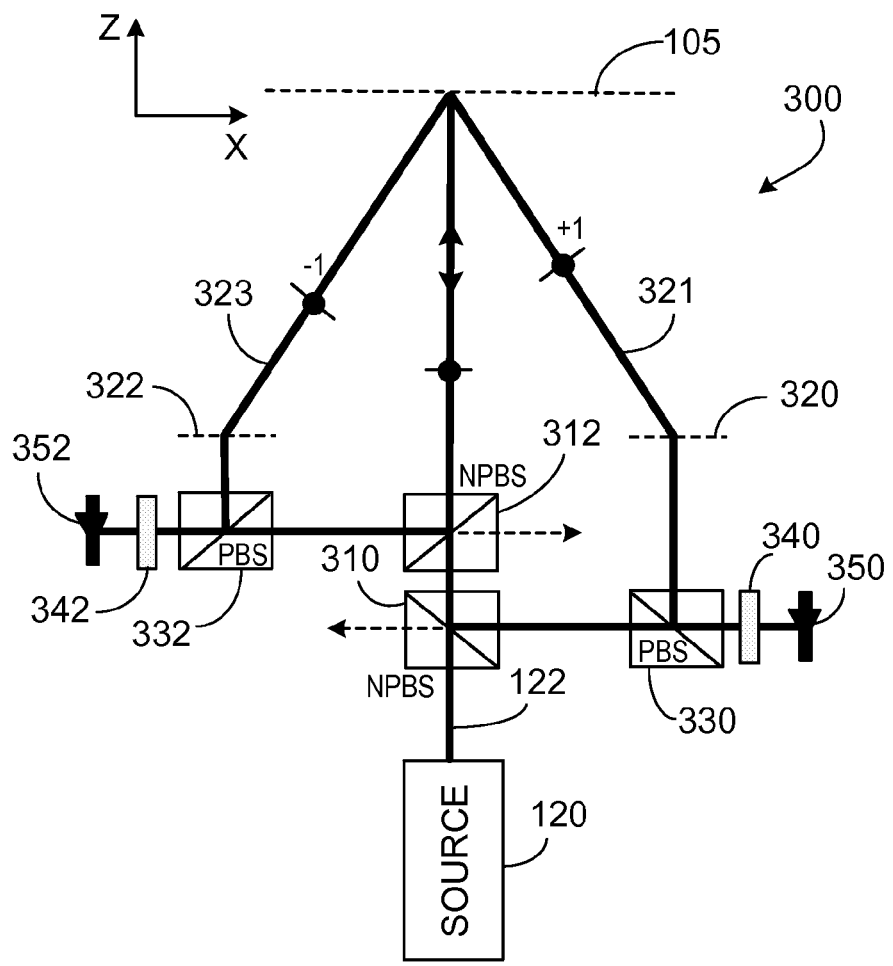
FIG. 3 is a schematic diagram of a portion of another embodiment of an encoder system.

In some embodiments, encoder systems can provide more than one measurement channel. Additional channels can be provided by using multiple encoder heads. Alternatively, or additionally, in certain embodiments, a single encoder head can be configured to provide multiple measurement channels. For example FIG. 3 shows an encoder system 300 that incorporates two measurement channels, each of which interfere either the +1 or −1 measurement beam diffracted orders separately to both improve motion sensitivity resolution and distinguish between encoder scale motion along the measurement beam axis (i.e., the Z-axis). Here, the second beam for each detection channel corresponds to the zeroth order diffraction of the measurement beam, which is nominally normally incident on encoder scale 105.

Encoder system 300 includes NPBS 310 and NPBS 312, PBS 330 and PBS 332, gratings 320 and 322, polarizers 340 and 342, and detectors 350 and 352. Source module 120 directs input beam 122 through NPBS 310 and NPBS 312 to contact encoder scale 105. Encoder scale 105 diffracts the incident beam into multiple orders, include the 0, +1, and −1 diffracted orders. The +1 diffracted beam is labeled as beam 321 and the −1 diffracted beam is labeled as beam 323. Each of these diffracted beams includes polarization components both in the plane of and orthogonal to the figure.

The zeroth order diffracted beam travels back to NPBS 312 and NPBS 310. Beam splitter 312 splits this beam directing a portion as beam 353 towards detector 352. Beam splitter 310 directs a portion as beam 351 towards detector 350.

The +1 and −1 diffracted beams 321 and 323 propagate to gratings 320 and 322, respectively. These gratings diffract beams 321 and 323 towards polarizing beam splitters 330 and 332, respectively. Gratings 320 and 322 can diffract the incident beams into additional directions, but other diffracted orders are omitted from the figures for clarity.

PBS 330 combines orthogonal polarization components from beam 321 and 351 to provide a first output beam. Polarizer 340 is positioned in the path of the output beam from polarizing beam splitter 330 and has its pass axis oriented to provide a mix of the orthogonal polarization states at detector 350. Similarly, PBS 332 combines orthogonal polarization components from beam 323 and 353 to provide a second output beam. Polarizer 342 provides a mix of the orthogonal polarization states in the second output beam to detector 352.

Since encoder scale motion in the Z direction is common to both channels' measurements, while encoder scale motion along X is detected with opposite signs, the two motions can be distinguished by a composite signal consisting of the sum or difference of the two separate phases. For this case the basic equations for the change in phase as a function of motion along X ($\Delta x$) and motion along Z ($\Delta z$) for the two detectors are $$\phi^+ = \frac{2\pi}{\Lambda}\Delta x + \frac{2\pi}{\lambda}(1+\cos(\theta))\Delta z \text{ and}$$

$$\phi^- = -\frac{2\pi}{\Lambda}\Delta x + \frac{2\pi}{\lambda}(1+\cos(\theta))\Delta z$$

where the ± superscripts represent + or − order, $\lambda$ is the illumination wavelength, $\Lambda$ is the encoder scale period and the $1^{st}$ order diffraction angle ($\theta$) is found from the encoder scale equation $\lambda=\Lambda \sin(\theta)$. To obtain the displacements in along the Z- and X-axes one forms the sum and difference equations $$\Delta z = \frac{\phi^+ + \phi^-}{4\pi}\left(\frac{\lambda}{1+\cos(\theta)}\right) \text{ and } \Delta x = \frac{\phi^+ - \phi^-}{4\pi}\Lambda.$$

In some embodiments, additional channels can be provided for measurement of the displacements along the Y-axis. For such 2-dimensional (2D) applications (X and Y measurements) an area grating can be used. For example, encoder scale 105 can be periodic in both the X- and Y-directions. The motion in the perpendicular (Y) axis can be obtained with another set of components rotated 90° about the Z-axis from the first, for example, providing two additional detection channels that provide a displacement in the Y-direction, $\Delta y$.

The embodiments shown in FIGS. 2A-2B and 3 suffer from sensitivity to both in-plane and out-of-plane test encoder scale 105 angular motions (e.g., rotations about the y-axis). In certain embodiments, this sensitivity can be reduced. For example, this sensitivity can be reduced by adding a retroreflector as shown by the embodiment in FIG. 4 to provide a double pass of measurement beam to encoder scale 105. Here, encoder system 400 includes a PBS 410 and retroreflectors 420 and 430. Source module 120 directs input beam 122 to PBS 410, which splits the input beam into a measurement beam 112 and a reference beam 402, where measurement beam 112 and reference beam 402 have orthogonal polarization states. Here, measurement beam 112 has s-polarization, which is reflected by the beam splitting interface of PBS 410, and reference beam 402 has p-polarization, which is transmitted by the interface. PBS 410 directs measurement beam 112 to encoder scale 105, which diffracts measurement beam 112 into various diffracted orders including a once-diffracted measurement beam 401 (e.g., corresponding to the +1 diffracted order). Retroreflector 430 is positioned to reflect once-diffracted measurement beam 401 back towards encoder scale 105, which diffracts the measurement beam back towards PBS 410 parallel to undiffracted measurement beam 112. The polarization state of beam 401 remains s-polarized, and is reflected by the interface of PBS 410 towards detector module 130.

P-polarized reference beam 402 is reflected by retroreflector 420 back to PBS 410 and recombines with the s-polarized measurement beam now twice-diffracted from encoder scale 105 at the PBS interface. The overlapping s-polarized and p-polarized beams form an output beam, which propagates to detection module 130. The result of this is that rotations of encoder scale 105 about the Y-axis result in a lateral displacement of twice-diffracted measurement beam relative to reference beam 402 when they are combined in the output beam, rather than an angular divergence between these beams.

Figure 4:
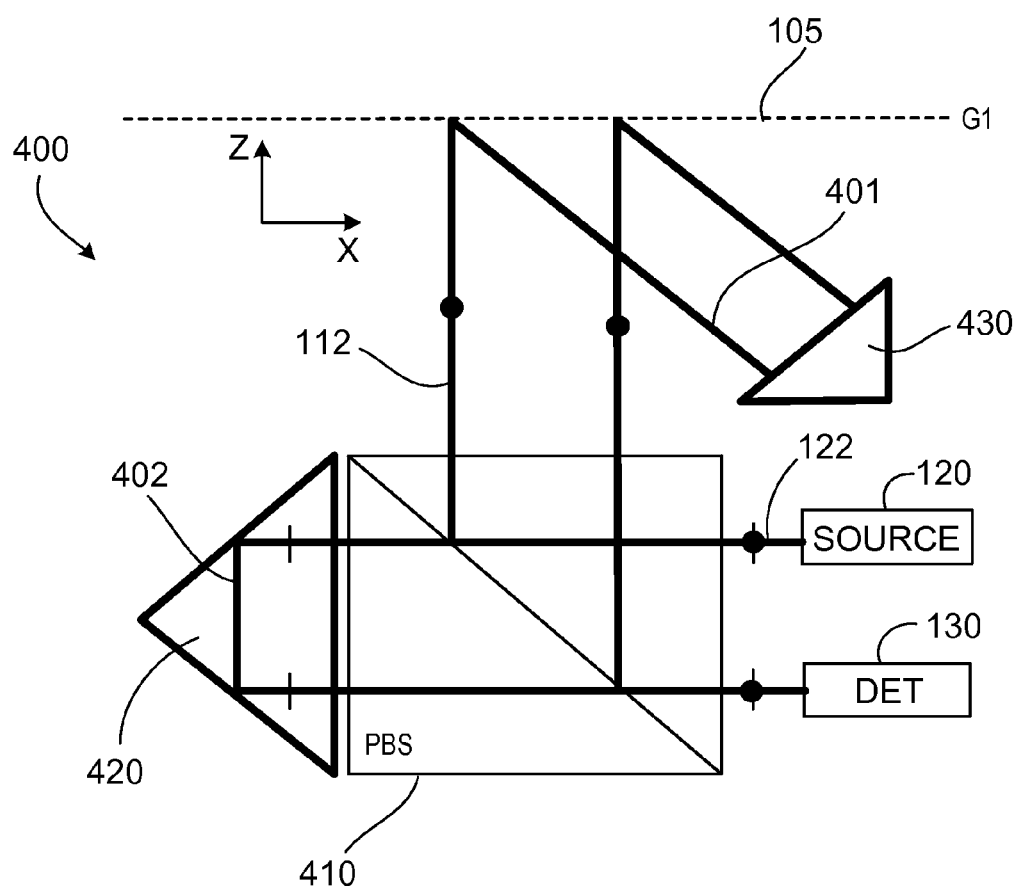
FIG. 4 is a schematic diagram of a portion of another embodiment of an encoder system.
Figure 5A:
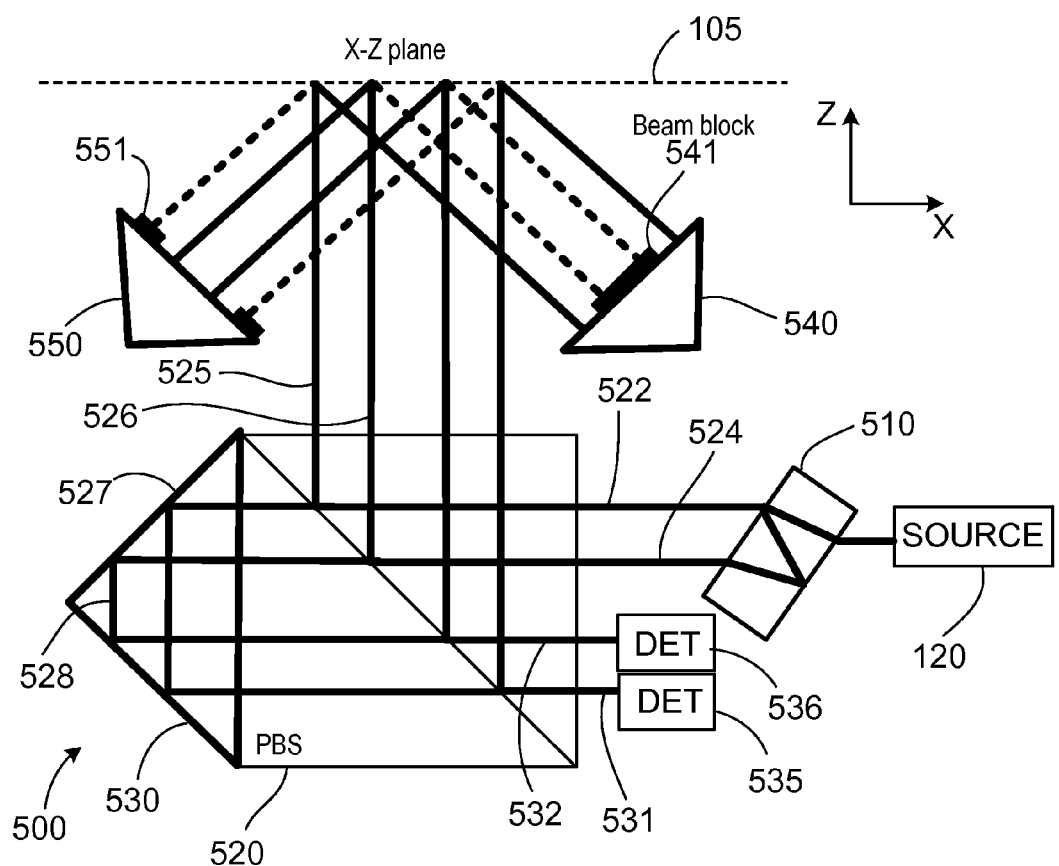
FIG. 5A is a schematic diagram of a portion of another embodiment of an encoder system.
Figure 5B:
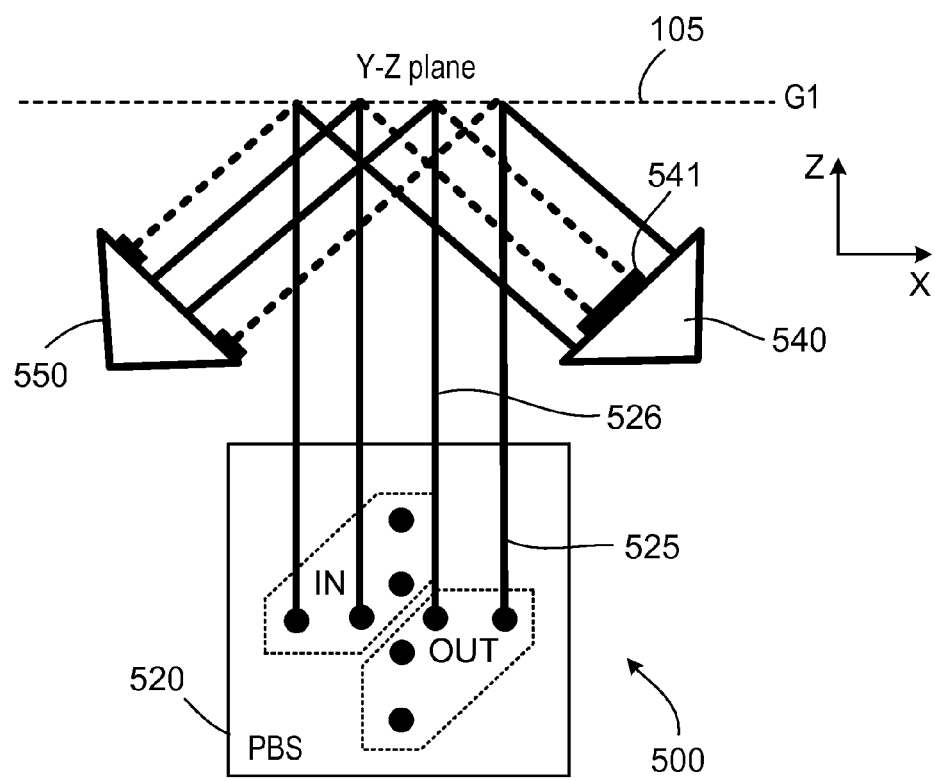
FIG. 5B is a schematic diagram of a portion of another embodiment of an encoder system.

In the same way as the embodiment shown in FIG. 3 implements a design similar to the encoder system in FIG. 2A adapted to monitor two channels based on the +/−1 diffracted orders, respectively, encoder system 400 in FIG. 4 can be adapted to utilize both the +/−1 diffracted orders for multiple measurement channels. For example, encoder system 500, shown in FIGS. 5A and 5B, provides two measurement channels which can be used for Z-motion discrimination. FIG. 5A shows encoder system 500 in the X-Z plane, while FIG. 5B shows the system in the Y-Z plane. Encoder system 500 includes a beam-splitting prism 510, a PBS 520 and retroreflectors 530, 540, and 550. Beam splitting prism 510 splits the input beam from source module 120 into two parallel beams 522 and 524 displaced from each other, which are then each split into orthogonally polarized beams at the beam splitting interface of PBS 520. PBS 520 directs one pair of beams 525 and 526 to encoder scale 105 and transmits the other pair of beams 527 and 528 to retroreflector 530.

Retroreflector 540 is positioned to retroreflect +1 order diffracted light from beam 525. Similarly, retroreflector 550 is positioned to retroreflect −1 order diffracted light from beam 526. The retroreflected beams from each retroreflector both diffract at encoder scale 105 a second time and the twice-diffracted beams are directed back towards PBS 520.

Beam blocks 541 and 551 are provided at retroreflectors 540 and 550, respectively, in the once-diffracted measurement beam path to isolate the appropriate diffracted order for each of the encoder scale interactions. Specifically, beam block 541 is positioned at retroreflector 540 to block +1 diffracted order light from beam 526. Beam block 551 is positioned at retroreflector 550 to block −1 diffracted order light from beam 525. The blocked beams are illustrated by dashed lines in FIGS. 5A and 5B.

The beams directed back to PBS 520 from encoder scale 105 overlap with beams 527 and 528 at the interface of PBS 520 to provide a pair of output beams 531 and 532. Detector module 130 includes a pair of detectors 535 and 536 positioned to detect output beams 531 and 532, respectively. Detector module also includes polarizers (not shown) to mix the orthogonally polarized components of the output beams.

In encoder system 500, the measurement beams are s-polarized. However, in general, encoder systems can be configured so that the measurement beam has other polarization states. For example, the polarization state of the measurement beam can be chosen to provide maximum diffraction intensity from encoder scale 105 into the diffracted order used for the measurement beam. For example, encoder systems can be arranged to so that the measurement beam has p-polarization.

Figure 5C:
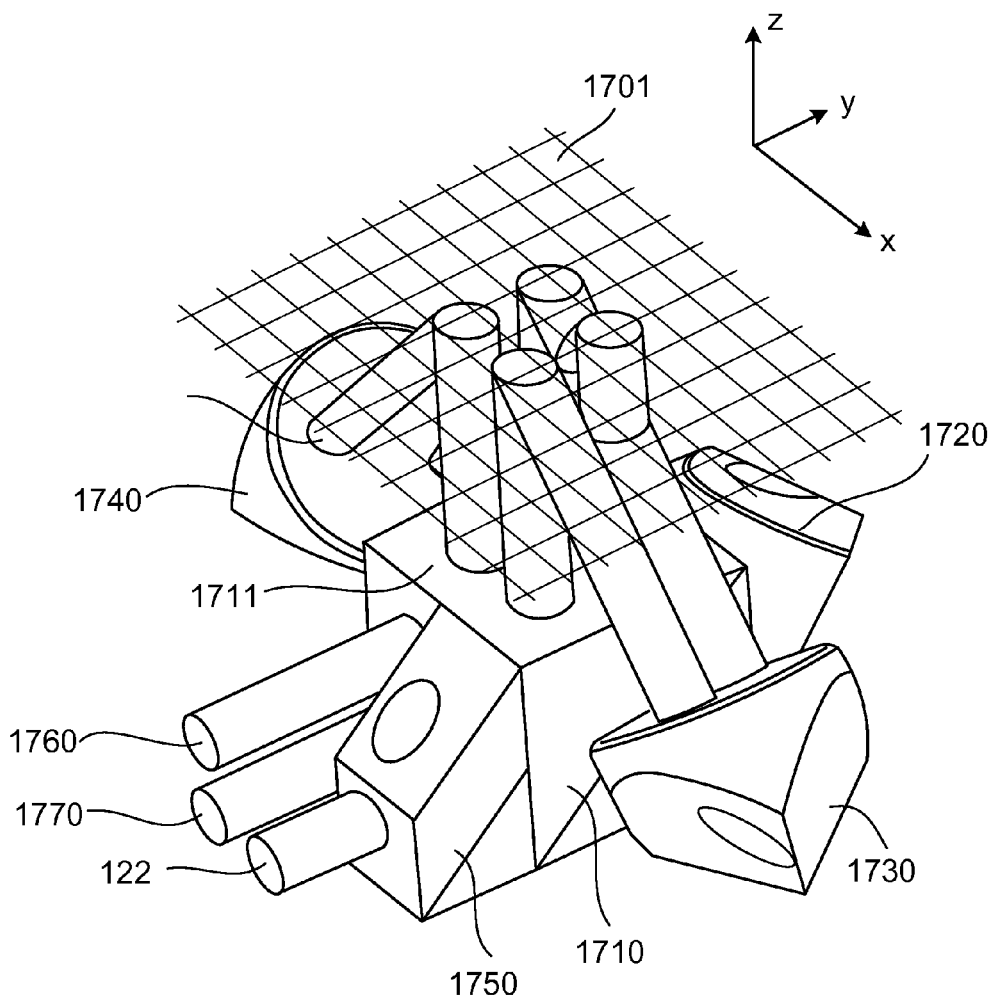
FIG. 5C is a schematic diagram of a portion of another embodiment of an encoder system.

Referring to FIG. 5C, an encoder system 1700, laid out in three dimensions, is configured to provide two measurement channels where the measurement beams have p-polarization at a grating 1701. Encoder system 1700 has an encoder head that includes a NPBS 1750, a PBS 1710 and retroreflectors 1730, 1740, and 1750. Encoder system 1700 also includes a half wave plate 1711 positioned at the face of PBS 1710 that faces grating 1701.

NPBS 1750 splits input beam into two beams and directs them along parallel paths to PBS 1710. PBS 1710 splits each of these beams into a measurement beam and a reference beam. The measurement beam has s-polarization and the reference beam has p-polarization. The reference beams reflect from retroreflector 1720 back to PBS 1710. The measurement beams pass through half wave plate 1711 which converts them from s-polarization to p-polarization. Both diffract at grating 1701. Retroreflector 1730 is positioned to reflect the +1 diffracted order of a first of the measurement beams. Retroreflector 1740 reflects the −1 diffracted order of the other measurement beam.

The measurement beams diffract from grating 1701 a second time back to PBS 1710. Prior to entering the PBS cube, half wave plate 1711 converts the polarization state of the measurement beams back from p-polarization to s-polarization. The measurement beams recombine with respective reference beams to form two output beams 1760 and 1770, which exit PBS 1710 propagating parallel to the Y-axis.

In encoder system 1700, the fact that the measurement beams are s-polarized with respect to the PBS, but have p-polarization with respect to the diffracted beams of the encoder scale can lead to higher diffraction efficiency and more efficient overall use of the input beam energy. Furthermore the encoder head can be relatively compact, particularly in the Z-direction. For example, in some embodiments, the encoder head can fit within a volume of less than 5 cubic inches (e.g., about 3 cubic inches or less, about 2 cubic inches or less, about 1 cubic inch or less). In certain embodiments, the encoder head has a thickness of an inch or less in the Z-direction (e.g., 1 cm or less, 0.5 cm or less).

Figure 6A:
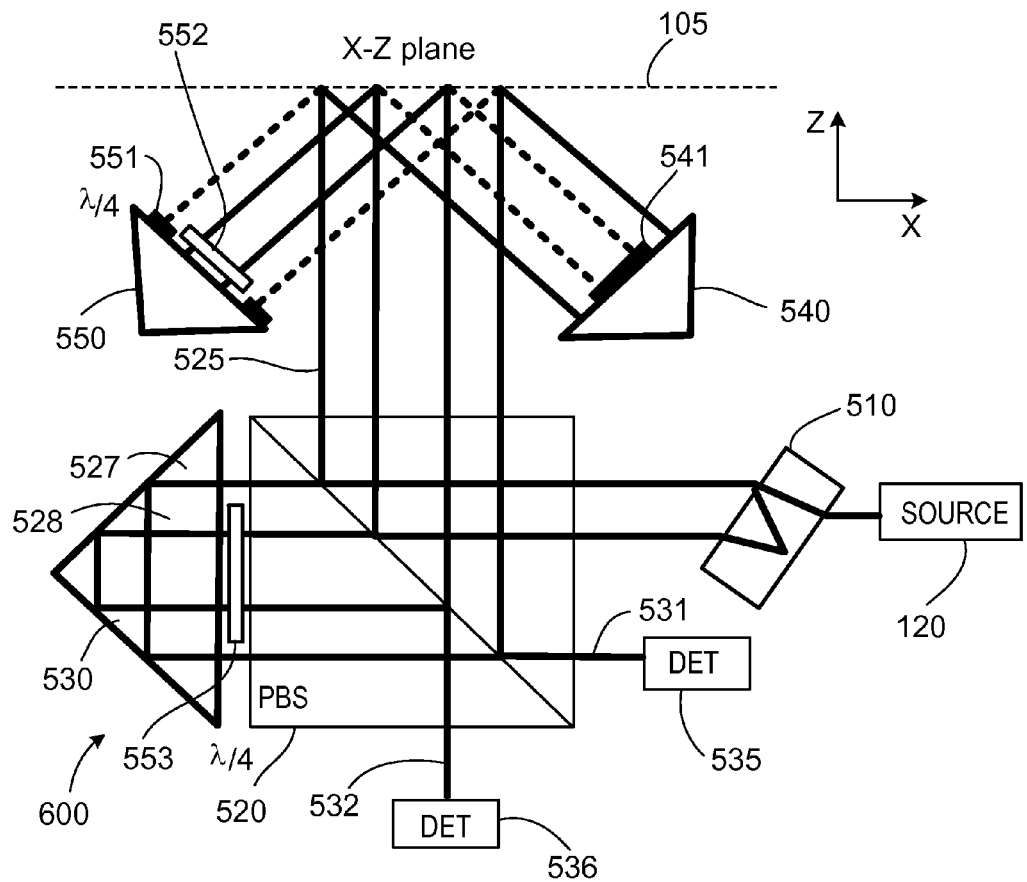
FIG. 6A is a schematic diagram of a portion of another embodiment of an encoder system.

In some embodiments, polarization modifying elements (e.g., wave plates of various retardations, such as $\lambda/4$ and/or $\lambda/8$ plates) can be incorporated a way to shift one or more of the beams to more convenient detection locations. For example, quarter wave plates can be positioned in the path of one of the diffracted measurement beams and a corresponding one of the reference beams, resulting in the corresponding output beam exiting the PBS from a different face than the other output beam. FIG. 6A shows an encoder system 600 similar in construction to encoder system 500 except that encoder system 600 includes quarter wave plates 552 and 553. Quarter wave plate 552 is positioned in the path of measurement beam 525 diffracted from encoder scale 105 and quarter wave plate 553 is positioned between PBS 520 and retroreflector 530 in the path of reference beam 528. Both beams make a double pass through the respective quarter wave plates so the effect of the wave plates is to transform the polarization state of the beam by rotating it through 90°. This change in polarization results in output beam 532 exiting PBS 520 through a different face than output beam 531.

Figure 6B:
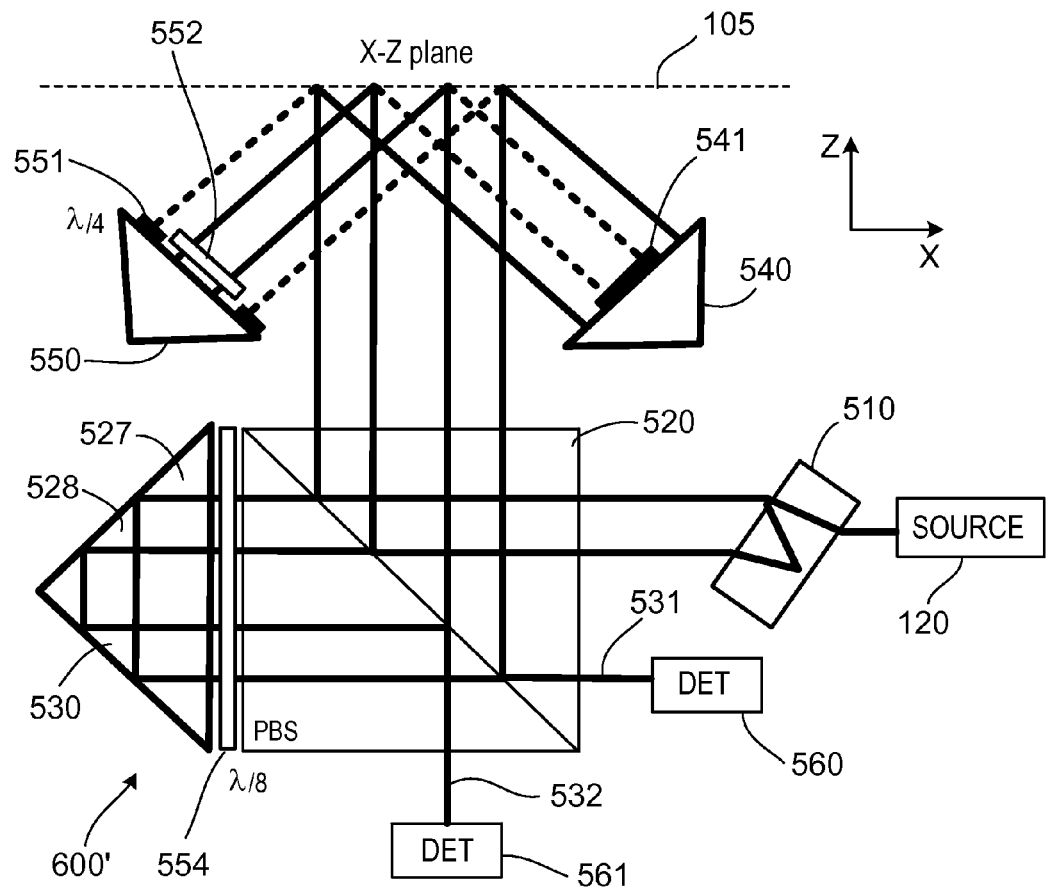
FIG. 6B is a schematic diagram of a portion of another embodiment of an encoder system.

As another example, referring to FIG. 6B, in encoder system 600', a λ/8 plate 554 is positioned between PBS 520 and retroreflector 530 in the path of both beams 527 and 528 to provide a heterodyne reference at both polarization states. In this embodiment, output beams 531 and 532 exit PBS 520 out different faces. λ/8 plate 554 in conjunction with PBS 520 split the reference beam toward both faces of the cube, allowing access to the interference signal at a face that depends only on the polarization state of the test beams. However, more generally, output beams can exit out of either face depending on which measurement beam paths include a quarter wave plate. For example, placing a λ/4 plate positioned to intercept the two returning test beams at the top face of the PBS would allow convenient access to the interference signal at both faces.

Figure 7:
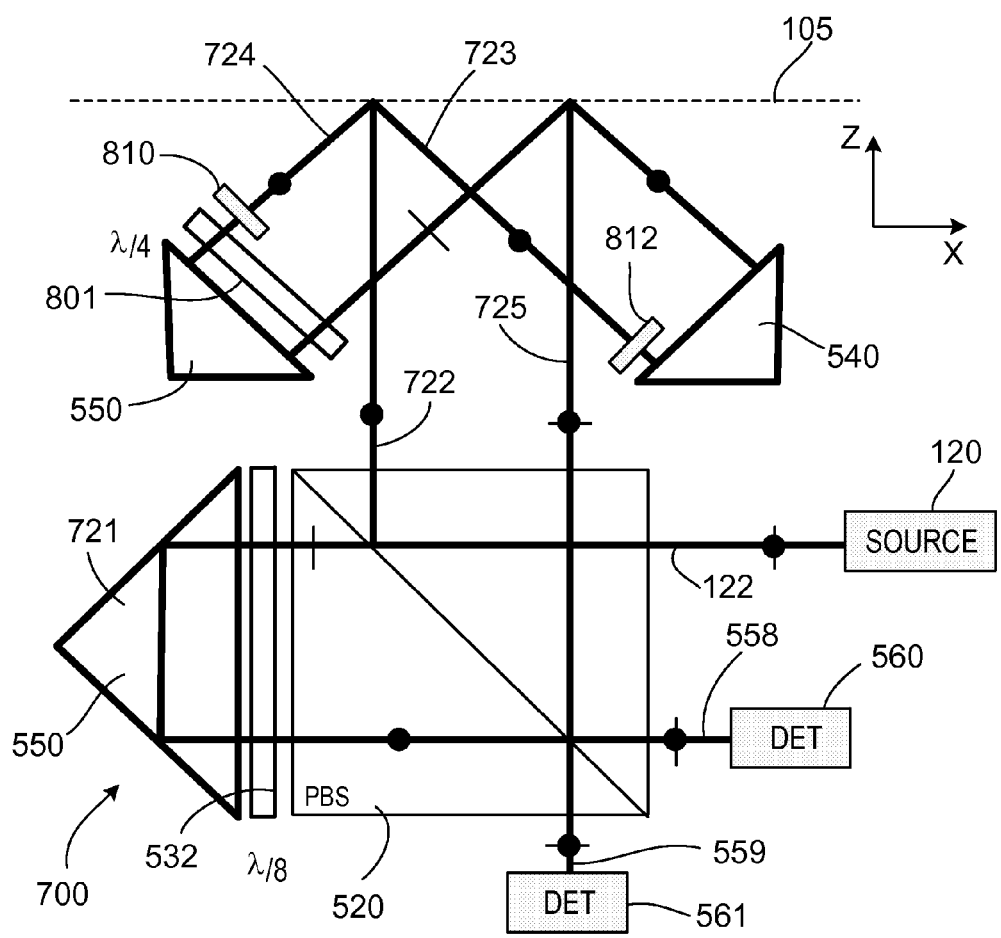
FIG. 7 is a schematic diagram of a portion of another embodiment of an encoder system.

In general, the use of polarization modulating elements can also enable the option of having collinear and coextensive beams for the left and right-hand retroreflectors, as shown, for example, in FIG. 7. Here, an encoder system 700 separates the output beams based on polarization state, rather than using spatial separation as before to provide two channel measurements. Encoder system 700 is similar to system 600 in the arrangement of PBS 520 and retroreflectors 530, 540, and 550. However, encoder system 700 does not include a beam splitter between source module 120 and PBS 520. PBS 520 splits input beam 122 into an s-polarized beam 722 and a p-polarized beam 721. Beam 722 diffracts from encoder scale 105 into multiple diffracted orders including the +1 diffracted order (beam 723) and the −1 diffracted order (beam 724). Retroreflectors 540 and 550 are positioned to reflect beams 723 and 724, respectively. Polarizers 810 and 812 are positioned in the path of the once-diffracted measurement beams 724 and 723 before they are reflected by the retroreflectors. Both polarizers have their transmission axes oriented to transmit s-polarized light. The polarizers limit the recirculation of the beam between retroreflectors 540 and 550. For example, in the absence of polarizer 810, consider beam 723 after travelling through retroreflector 540 and striking encoder scale 105. There will be a $0^{th}$ order reflection that passes through retroreflector 550, reflects from encoder scale 105 again and recirculates though retroreflector 540 before diffracting from encoder scale 105 to become beam 725. Polarizers 810 and 812 eliminate this recirculating beam and its counterpart that traverses the retroreflector 540 first.

Encoder system 700 also includes a quarter wave plate 801 between retroreflector 550 and encoder scale 105 in the path of beam 724. The double pass of beam 724 through quarter wave plate 801 transforms the polarization state of beam 724 from s-polarization to p-polarization. Beams 723 and 724 are incident at the same location of encoder scale 105 where they are diffracted again by the encoder scale. Twice-diffracted beams 723 and 724 recombine to form beam 725 that propagates back towards PBS 520 along a path parallel to beam 722.

Encoder system 700 includes a λ/8 plate 532 between PBS 520 and retroreflector 730. Reference beam 721, which is reflected by retroreflector 530, passes through λ/8 plate twice and is transformed from p-polarized light to circularly polarized light. PBS 520 combines the s-polarized component of measurement beam 725 and the p-polarized component of reference beam 721 to form a first output beam 558 that is detected by detector 560. PBS 520 also combines the p-polarized component of measurement beam 725 with the s-polarized component of reference beam 721 to form a second output beam 559 that is detected by detector 561. Polarizers can be positioned between PBS 520 and detectors 560 and 561, but are not shown in FIG. 7.

In general, while the foregoing embodiments utilize the zeroth and/or +/−$1^{st}$ order diffraction from the encoder scale, higher diffraction orders can also be used. For example, referring to FIG. 8, in some embodiments, one or both components of the input beam are directed to encoder scale 105 and one diffracted component is allowed to interfere with another diffracted component. FIG. 8 shows an encoder system 800 that includes a mirror 830 (or other reflective element), a grating 840, and a polarizing beam splitter 810. Encoder system 800 further includes source module 120 and a detector module including a detector 820 and a polarizer 812.

Source module 120 illuminates encoder scale 105 with input beam 122 which is diffracted into multiple orders including the +1 diffracted order (beam 821) and +2 diffracted order (beam 822). Beam 821 propagates to PBS 810 via grating 840 and beam 822 propagates to beam 822 via mirror 830. PBS 810 combines the s-polarized component of beam 821 and the p-polarized component of beam 822 to form an output beam that is directed through polarizer 812 to detector 820.

In encoder system 800, the $1^{st}$ and $2^{nd}$ order diffracted beams interfere. One advantage in allowing both interfering components to interact with the encoder scale is that out-of-plane encoder scale rotations (e.g., about the Y-axis) are then common mode because both the first and second diffraction orders are subject to the same rotation. A similar embodiment is shown in FIG. 9. Here, encoder system 900 uses a bulk optic component 850 (e.g., a prism) instead of the grating 840 used in encoder system 800. In addition, the system is configured to measure an output beam formed from the p-polarized component of beam 821 and the s-polarized component of beam 822.

More complicated structures can be built up to, e.g., to provide additional measurement channels and/or improve sensitivity and or minimize sources of error. For example, FIG. 10 shows a two-measurement channel encoder system 1000 that uses the +1, +2 and −1, −2 diffracted orders separately to both improve motion sensitivity resolution and distinguish between encoder scale motion along the measurement beam axis (Z-axis). For one measurement channel, encoder system 1000 uses the same structure as encoder system 900. The second channel is provided using an identical set of components (i.e., a PBS 1010, a bulk optical component 1050, a mirror 1030, a polarizer 1012, and a detector 1020) arranged symmetrically with respect to input beam 122 to utilize the −1 and −2 diffracted orders.

Since encoder scale motion in the Z direction is common to both channels, while encoder scale motion along X is detected with opposite signs, the two motions can be distinguished by a composite signal consisting of the sum or difference of the two separate phases. For the embodiment shown in FIG. 10, the basic equations for the change in phase as a function of motion along X ($\Delta x$) and motion along Z ($\Delta z$) for the two detectors are $$\phi^+ = \frac{2\pi}{\lambda}(1+\cos(\theta_2))\Delta z + 2\frac{2\pi}{\Lambda}\Delta x - \left[\frac{2\pi}{\lambda}(1+\cos(\theta_1))\Delta z + \frac{2\pi}{\Lambda}\Delta x\right]$$

$$= \frac{2\pi}{\Lambda}[\Delta x + \Delta z(\cos(\theta_2) - \cos(\theta_1))]$$

$$= \frac{2\pi}{\Lambda}\left[\Delta x + \Delta z\left(\sqrt{1-\left(\frac{2\lambda}{\Lambda}\right)^2} - \sqrt{1-\left(\frac{\lambda}{\Lambda}\right)^2}\right)\right]$$

$$\phi^- = \frac{2\pi}{\lambda}(1+\cos(\theta_2))\Delta z - 2\frac{2\pi}{\Lambda}\Delta x - \left[\frac{2\pi}{\lambda}(1+\cos(\theta_1))\Delta z - \frac{2\pi}{\Lambda}\Delta x\right]$$

$$= \frac{2\pi}{\Lambda}[-\Delta x + \Delta z(\cos(\theta_2) - \cos(\theta_1))]$$

$$= \frac{2\pi}{\Lambda}\left[-\Delta x + \Delta z\left(\sqrt{1-\left(\frac{2\lambda}{\Lambda}\right)^2} - \sqrt{1-\left(\frac{\lambda}{\Lambda}\right)^2}\right)\right]$$

where the ± superscripts represent + or − order, $\lambda$ is the illumination wavelength, $\Lambda$ is the encoder scale period and the encoder scale equation $n\lambda = \Lambda \sin(\theta_n)$ describes the $n^{th}$ order diffraction angle. To obtain the displacements one forms the following simple sum and difference equations $$\Delta z = \frac{\phi^+ + \phi^-}{4\pi} \frac{\Lambda}{\left(\sqrt{1-\left(\frac{2\lambda}{\Lambda}\right)^2} - \sqrt{1-\left(\frac{\lambda}{\Lambda}\right)^2}\right)} \text{ and } \Delta x = \frac{\phi^+ + \phi^-}{4\pi}\Lambda.$$

Figure 11:
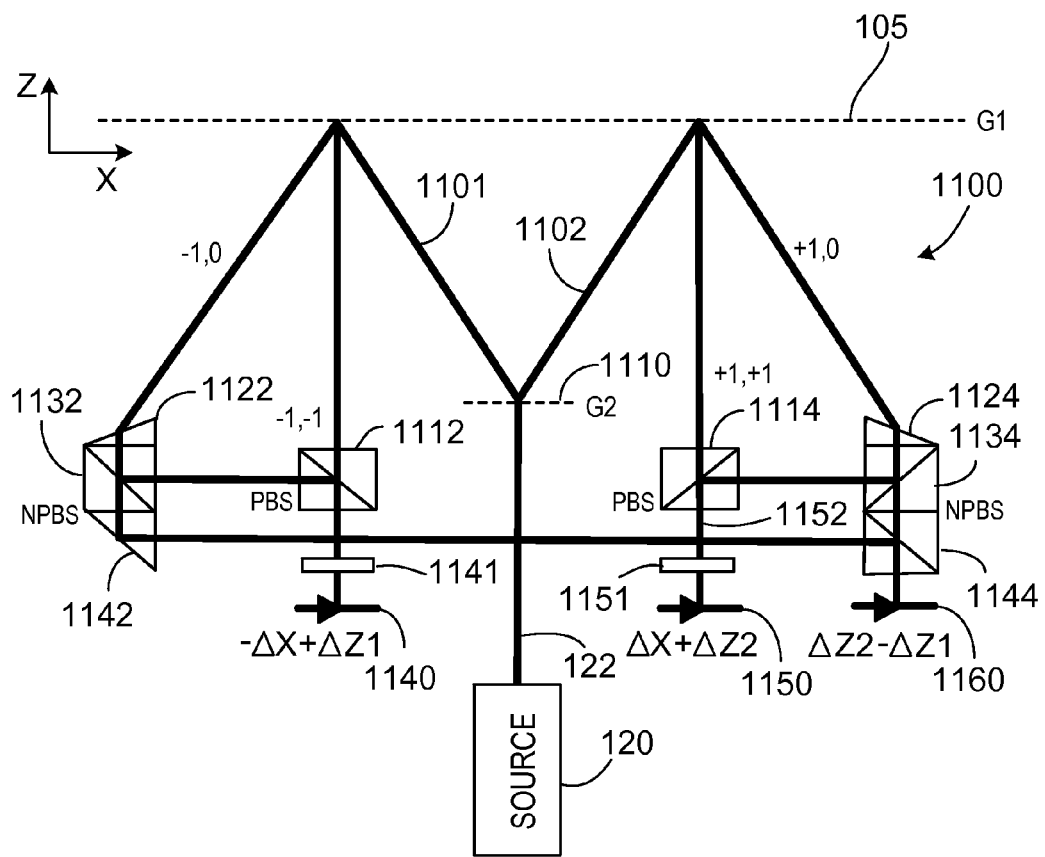
FIG. 11 is a schematic diagram of a portion of another embodiment of an encoder system.

In general, embodiments can feature more than two measurement channels and/or can be arranged to measure tilt angles of the measurement object in addition or alternative to encoder scale displacements. For example, with reference to FIG. 11, an encoder system 1100 allows the calculation of measurement object local tilt by splitting input beam 122 and interrogating encoder scale 105 at two separated points. In the present example, encoder system 1100 includes a grating 1110 (e.g., having the same pitch as encoder scale 105) which splits input beam 122 into two beams 1101 and 1102 (e.g., the −1 and +1 diffracted orders, respectively). Other types of beam splitter, such as a non-diffractive beam splitter, can be used.

A first measurement channel is provided from the +1 and zeroth diffracted orders of beam 1102. Encoder system 1100 includes a PBS 1114 positioned in the path of the +1 diffracted order and a prism 1124 and a NPBS 1134 in the path of the zeroth diffracted order. NPBS 1134 directs a portion of the zeroth diffracted order of beam 1102 to PBS 1114 where it is combined with a component of the +1 diffracted order to form a first output beam 1152, which is analyzed by a polarizer 1151 before detection by a detector 1150. The interference phase detected at this detector is sensitive to X-motion of encoder scale 105 and to Z-motion at the location where beam 1102 strikes encoder scale 105.

A second measurement channel is provided from the −1 and zeroth diffracted orders of beam 1101. Encoder system 1100 includes a polarizing beam splitter 1112 positioned in the path of the −1 diffracted order and a prism 1122 and non-polarizing beam splitter 1132 in the path of the zeroth diffracted order. Beam splitter 1132 directs a portion of the zeroth diffracted order of beam 1101 to PBS 1112 where it is combined with a component of the −1 diffracted order to form a second output beam 1142. A polarizer 1141 analyzes output beam 1142, which is then detected by a detector 1140. The interference phase detected at detector 1140 is sensitive to X-motion of encoder scale 105 and to Z-motion at the location where beam 1101 strikes encoder scale 105.

A third measurement channel is provided using zeroth diffracted order of beam 1101 and the zeroth diffracted order of beam 1102. Encoder system 1100 includes an optical element (e.g., a prism) which reflects a portion of the zeroth diffracted order of beam 1101 towards a polarizing beam splitter 1144 positioned adjacent to non-polarizing beam splitter 1134, where it is combined with a portion of the zeroth diffracted order of beam 1102. The combined beam is detected by detector 1160.

The third measurement channel, which effectively monitors the measurement object tilt about the geometric mean between the two points, is necessary to solve for the separate motions since they are coupled. The equations governing the phase measurements in this geometry are $$\phi^+ = \frac{2\pi}{\lambda}\left(\frac{1}{\cos(\theta)} - 1\right)\Delta z^+ + \frac{2\pi}{\Lambda}\Delta x$$

$$\phi^- = \frac{2\pi}{\lambda}\left(\frac{1}{\cos(\theta)} - 1\right)\Delta z^- - \frac{2\pi}{\Lambda}\Delta x$$

$$\phi^z = \frac{2\pi}{\lambda}\left(\frac{2}{\cos(\theta)}\right)(\Delta z^+ - \Delta z^-)$$

where $\theta$ is the $1^{st}$ order diffraction angle given by $\lambda = \Lambda \sin(\theta)$, $\phi^\pm$ are the two phases from the +/− diffracted beams and $\phi^z$ is the phase from the interference of the two $0^{th}$ order beams. This is a simple linear system of three equations. Solving for the three motions;

$$\Delta z^+ = \frac{\lambda}{4\pi}\left[(\phi^+ + \phi^-)\left(\frac{\cos(\theta)}{1-\cos(\theta)}\right) + \phi^z\frac{\cos(\theta)}{2}\right]$$

$$\Delta z^- = \frac{\lambda}{4\pi}\left[(\phi^+ + \phi^-)\left(\frac{\cos(\theta)}{1-\cos(\theta)}\right) - \phi^z\frac{\cos(\theta)}{2}\right]$$

$$\Delta x = \frac{\Lambda}{4\pi}\left[\phi^+ - \phi^- - \phi^z\left(\frac{1-\cos(\theta)}{2}\right)\right]$$

Duplicating this geometry in the YZ plane provides motion monitoring along both X- and Y-axes.

Figure 12:
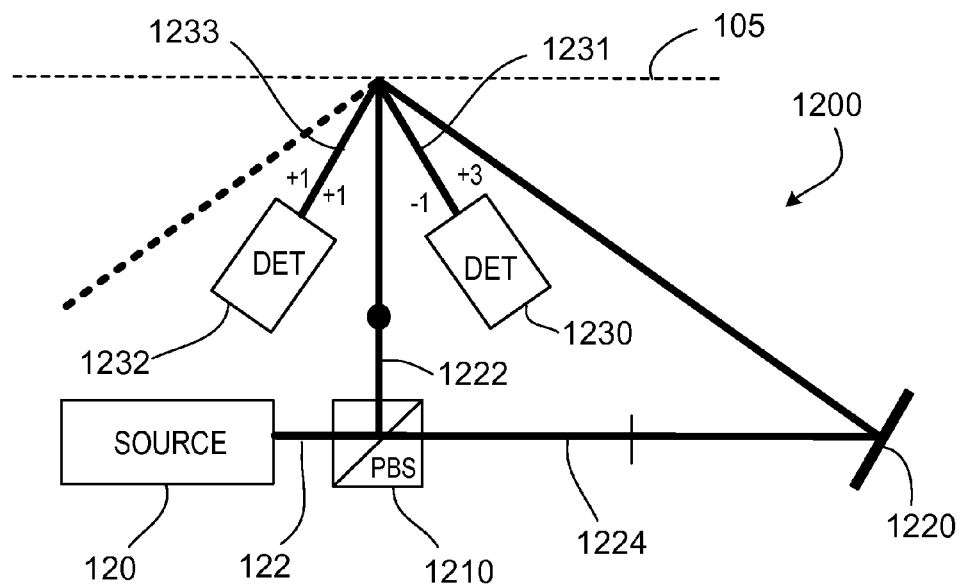
FIG. 12 is a schematic diagram of a portion of another embodiment of an encoder system.

Another embodiment is shown in FIG. 12 where two frequency components are separated in space and angle allowing combination of different diffracted orders automatically upon interacting with encoder scale 105. Here, encoder 1200 includes a PBS 1210, which splits input beam 122 into an s-polarized beam 1222 and a p-polarized beam 1224. PBS 1210 directs beam 1222 towards encoder scale 105 and transmits beam 1224, which reflects from a mirror 1220 towards encoder scale 105. Mirror 1220 is oriented so that beam 1224 contacts encoder scale 105 at the same location as beam 1222. Beam 1222 is normally (at least nominally) incident on encoder scale 105 and beam 1224 is incident on encoder scale 105 along a non-normal direction. Both beams are diffracted into multiple diffracted orders by encoder scale 105 and the system is arranged so that two diffracted orders from each of beams 1222 and 1224 overlap, providing two output beams 1231 and 1233. While, in general, a variety of different diffracted orders can be selected for the output beams, in some embodiments, output beam 1231 can be formed from the −1 diffracted order of beam 1222 and the +3 diffracted order of beam 1224. Output beam 1233 can be formed from the +1 diffracted order of beam 1222 and the +1 diffracted order of beam 1224. Detectors 1230 and 1232 are positioned to detect the output beams.

Figure 13:
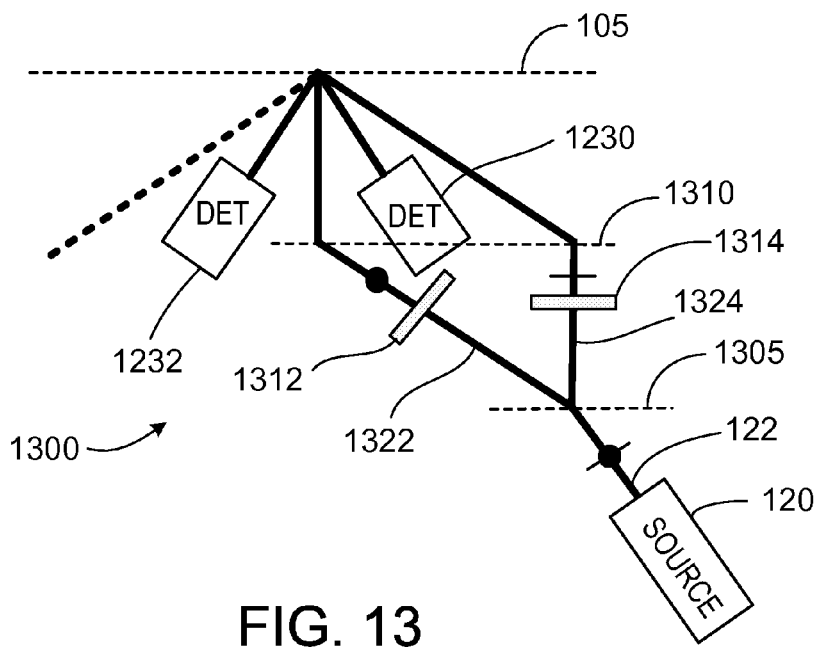
FIG. 13 is a schematic diagram of a portion of another embodiment of an encoder system.

FIG. 13 shows a further embodiment, encoder system 1300, similar to encoder system 1200 but where the beam geometry is accomplished through the use of two fixed gratings, 1305 and 1310 instead of a PBS. Encoder system 1300 also includes two polarizers 1312 and 1314, positioned between grating 1305 and 1310. Here, grating 1305 diffracts input beam 122 into various diffracted orders including beams 1322 and 1324 (e.g., the +1 and −1 diffracted orders). Polarizer 1312 is positioned in the path of beam 1322 and transmitted the s-polarized component of beam 1322. Polarizer 1314 is positioned in the path of beam 1324 and transmits the p-polarized component of this beam. Now-polarized beams 1322 and 1324 are diffracted by grating 1310 and propagate towards encoder scale 105 along paths corresponding to beams 1222 and 1224, respectively, as described with reference to FIG. 12.

Encoder systems 1200 and 1300 show different optical arrangements for achieving similar measurements. Other configurations, including combinations of diffractive and/or non-diffractive optics, are possible.

In general, the path of one or more beams used in an encoder system can be adapted to spatial requirements of its end-use application. For example, one or more beam paths can be folded to conform to the encoder system to a specific space. For example, referring to FIGS. 14A-14C, an encoder system 1400 includes a PBS 1410 and a pair of mirrors 1422 and 1424 that lie in a plane (the X-Y plane as shown in FIG. 16A) parallel to the plane in which encoder scale 105 lies. FIG. 14A shows an operational view of encoder system 1400, while FIGS. 14B and 14C show views in the X-Y and Y-Z planes, respectively. PBS 1410 splits light from the source into two beams 1421 and 1423 having orthogonal polarization states, and each reflects from one of mirrors 1422 and 1424 so that the beams are redirected to contact encoder scale 105 at a common point. A fold mirror 1412 redirects beams 1421 and 1423 out of the X-Y plane towards encoder scale 105, which diffracts the incident light into one or more diffracted orders including a pair of parallel, co-extensive beams that form output beam 1401, leaving encoder scale 105 parallel to the Z-axis. A detector 1420 is positioned to receive output beam 1401, providing a heterodyne interference signal in the same manner as discussed above.

As shown in FIG. 14A, beams 1421 and 1423 from the PBS 1410 are incident on encoder scale 105 at an incident angle, $\theta$, measured with respect to the Z-axis. Mirror 1412 includes an aperture 1415 positioned in the path of output beam 1401, allowing the output beam passage through to detector 1420.

Of course, other configurations for directing the diffracted beams to the detector are also possible. For example, in some embodiments, a beam splitter can be used rather than a mirror, allowing passage of a portion of the diffracted light to the detector. Alternatively, or additionally, an additional mirror can be placed between fold mirror 1412 and PBS 1410, oriented to direct output beam 1401 to the detector.

Encoder system 1400 may have a number of advantages. For example, the encoder system has, to $1^{st}$ order, no tilt or yaw sensitivity but is only sensitive to X motion (as shown). Further, such encoder systems can provide relatively efficient use of light from the source, for example, relative to encoder systems where the light makes multiple passes to the measurement object, in each of which only a fraction of the incident light is diffracted into the usable order(s).

In embodiments, folding the optical path of the encoder system can allow a designer to adapt the encoder head optics to spaces that may be relatively narrow in at least one dimension. For example, the encoder shown in FIGS. 16A-16C can have a small footprint in the Z-direction, allowing such encoders to be installed in relatively small spaces in the Z-direction.

In embodiments where sensitivity to additional degrees of freedom of the measurement object is desired, additional encoder heads or other devices can be provided. For example, for Y motion sensitivity, another encoder head, similar to the one shown in FIGS. 14A-14C, oriented at 90° (about the Z-axis) may be included. Of course, such a configuration would include the measurement object to diffract light in the Y-direction as well as the X-direction. For example, the measurement object can include two gratings oriented at right angles, or can be periodic in both the X- and Y-directions. For Z-motion, a displacement measuring interferometer (e.g., a high stability plane mirror interferometer, striking the encoder scale normally) can be used.

In certain embodiments, X and Y motion encoders and a Z-motion interferometer can sample different points on the measurement object, but without Z sensitivity sampling different points generally does not introduce tilt sensitivity.

In certain embodiments, folding optics (e.g., fold mirrors) can be integrated with other components of the optical assembly forming the encoder head. For example, referring to FIGS. 15A-15C, an encoder system 1500 includes a compound monolithic assembly 1501 in which a PBS interface 1510, mirrors 1512 and 1514, and a fold mirror 1520 are all provided by different interfaces of a single compound optical component. For example, assembly 1501 can be formed from two pieces of, e.g., glass, glued together with a PBS coating at the glue interface. Mirror interfaces 1512 and 1514 can include reflective coatings (e.g., silver or multilayer dielectric coatings), or can be arranged so that the reflection occurs due to total internal reflection within the element. The assembly can have a relatively small dimension in the Z-direction. For example, the assembly can be less than 1 inch thick in the Z-direction (e.g., about 1 cm or less, about 0.5 cm or less). Depending on the end use, the assembly can occupy a volume of 1 cubic inch or less.

In general, any of the analysis methods described above, including determining information about a degree of freedom of the encoder scales, can be implemented in computer hardware or software, or a combination of both. For example, in some embodiments, electronic processor 150 can be installed in a computer and connected to one or more encoder systems and configured to perform analysis of signals from the encoder systems. Analysis can be implemented in computer programs using standard programming techniques following the methods described herein. Program code is applied to input data (e.g., interferometric phase information) to perform the functions described herein and generate output information (e.g., degree of freedom information). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution.

The analysis methods can also be implemented as a computer-readable storage medium, configured with a computer program, where the storage medium so configured causes a computer to operate in a specific and predefined manner to perform the functions described herein.

Lithography Tool Applications

Lithography tools are especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see, for example, the Semiconductor Industry Roadmap, p. 82 (1997).

Overlay depends directly on the performance, i.e., accuracy and precision, of the metrology system used to position the wafer and reticle (or mask) stages. Since a lithography tool may produce $50-100M/year of product, the economic value from improved metrology systems is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photochemical processes in the resist that convert the radiation pattern into a latent image within the resist.

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer. In certain lithography tools, e.g., lithography scanners, the mask is also positioned on a translatable stage that is moved in concert with the wafer during exposure.

Encoder systems, such as those discussed previously, are important components of the positioning mechanisms that control the position of the wafer and reticle, and register the reticle image on the wafer. If such encoder systems include the features described above, the accuracy of distances measured by the systems can be increased and/or maintained over longer periods without offline maintenance, resulting in higher throughput due to increased yields and less tool downtime.

In general, the lithography tool, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Encoder systems described above can be used to precisely measure the positions of each of the wafer stage and mask stage relative to other components of the exposure system, such as the lens assembly, radiation source, or support structure. In such cases, the encoder system's optical assembly can be attached to a stationary structure and the encoder scale attached to a movable element such as one of the mask and wafer stages. Alternatively, the situation can be reversed, with the optical assembly attached to a movable object and the encoder scale attached to a stationary object.

More generally, such encoder systems can be used to measure the position of any one component of the exposure system relative to any other component of the exposure system, in which the optical assembly is attached to, or supported by, one of the components and the encoder scale is attached, or is supported by the other of the components.

Figure 16:
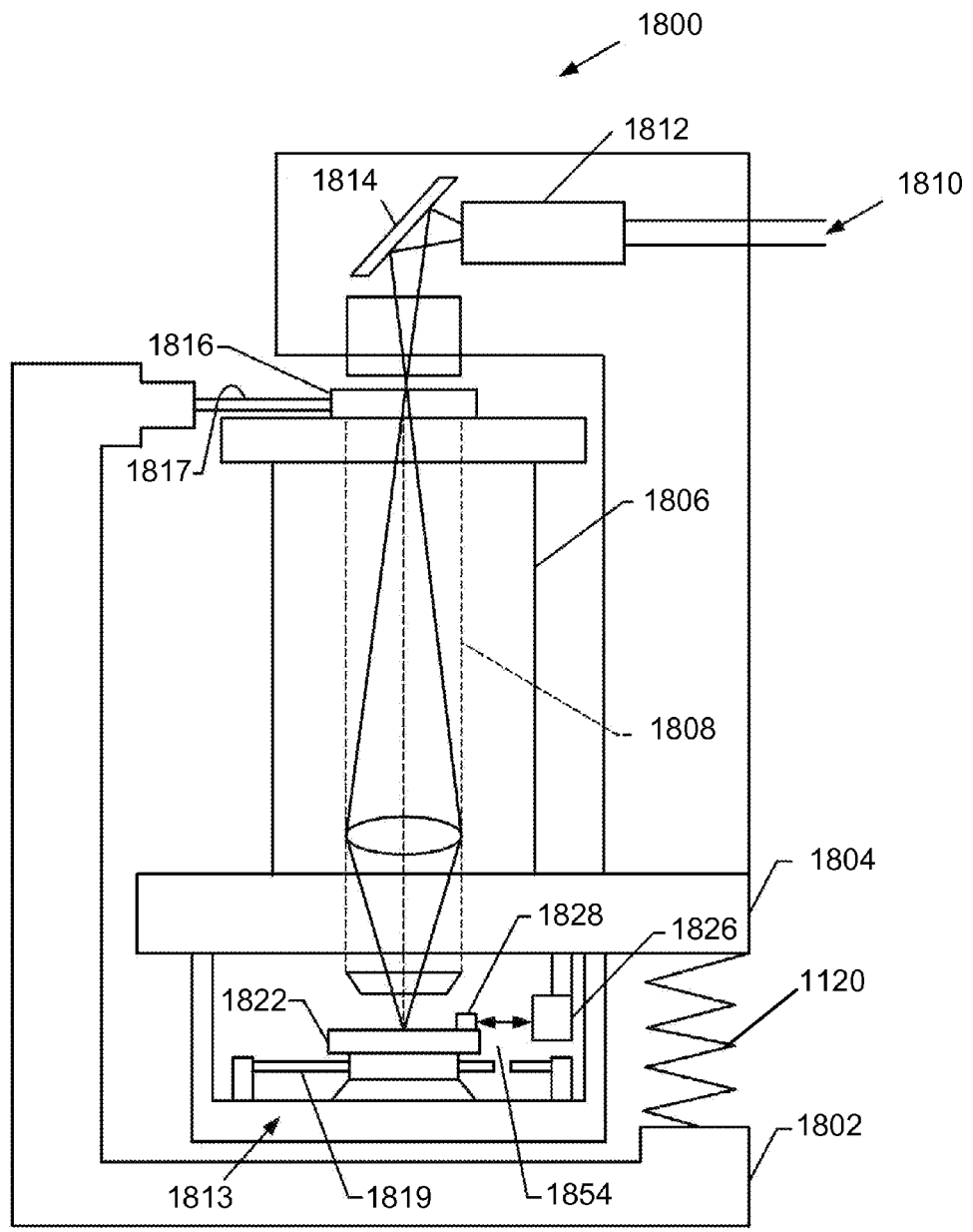
FIG. 16 is a schematic diagram of an embodiment of a lithography tool that includes an interferometer.

An example of a lithography tool 1800 using an interferometry system 1826 is shown in FIG. 16. The encoder system is used to precisely measure the position of a wafer (not shown) within an exposure system. Here, stage 1822 is used to position and support the wafer relative to an exposure station. Scanner 1800 includes a frame 1802, which carries other support structures and various components carried on those structures. An exposure base 1804 has mounted on top of it a lens housing 1806 atop of which is mounted a reticle or mask stage 1816, which is used to support a reticle or mask. A positioning system for positioning the mask relative to the exposure station is indicated schematically by element 1817. Positioning system 1817 can include, e.g., piezoelectric transducer elements and corresponding control electronics. Although, it is not included in this described embodiment, one or more of the encoder systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1804 is a support base 1813 that carries wafer stage 1822. Stage 1822 includes a measurement object 1828 for diffracting a measurement beam 1854 directed to the stage by optical assembly 1826. A positioning system for positioning stage 1822 relative to optical assembly 1826 is indicated schematically by element 1819. Positioning system 1819 can include, e.g., piezoelectric transducer elements and corresponding control electronics. The measurement object diffracts the measurement beam reflects back to the optical assembly, which is mounted on exposure base 1104. The encoder system can be any of the embodiments described previously.

During operation, a radiation beam 1810, e.g., an ultraviolet (UV) beam from a UV laser (not shown), passes through a beam shaping optics assembly 1812 and travels downward after reflecting from mirror 1814. Thereafter, the radiation beam passes through a mask (not shown) carried by mask stage 1816. The mask (not shown) is imaged onto a wafer (not shown) on wafer stage 1822 via a lens assembly 1808 carried in a lens housing 1806. Base 1804 and the various components supported by it are isolated from environmental vibrations by a damping system depicted by spring 1820.

In some embodiments, one or more of the encoder systems described previously can be used to measure displacement along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In certain embodiments, the optical assembly 1826 can be positioned to measure changes in the position of reticle (or mask) stage 1816 or other movable components of the scanner system. Finally, the encoder systems can be used in a similar fashion with lithography systems involving steppers, in addition to, or rather than, scanners.

Figure 17A:
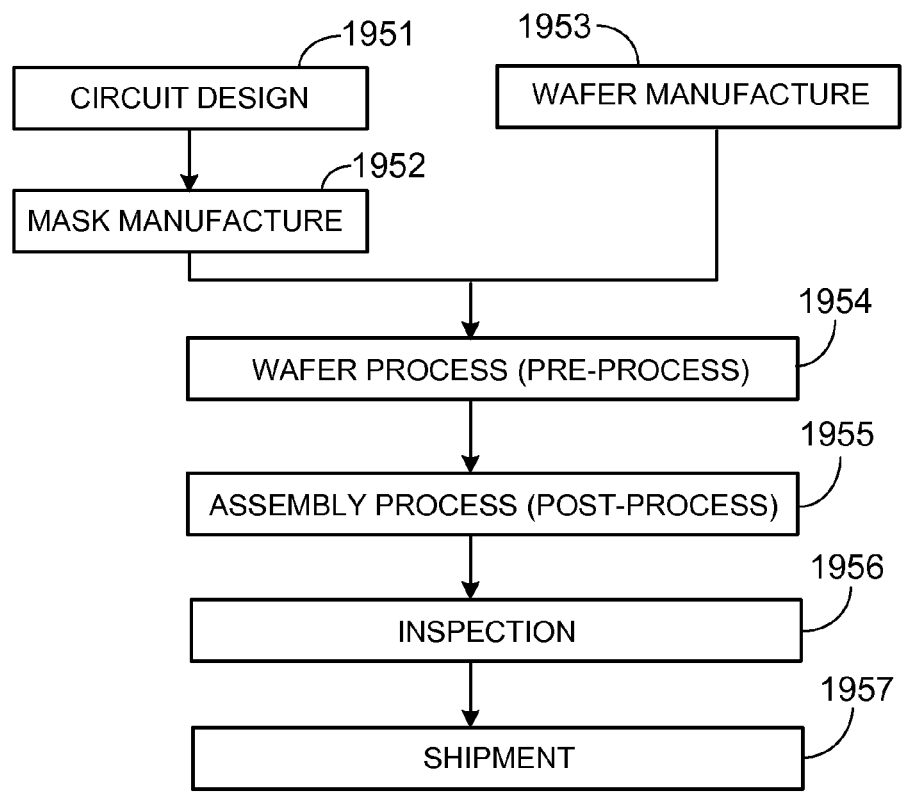
FIG. 17A and FIG. 17B are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 17A and 17B. FIG. 17A is a flow chart of the sequence of manufacturing a semiconductor device such as a semiconductor chip (e.g., IC or LSI), a liquid crystal panel or a CCD. Step 1951 is a design process for designing the circuit of a semiconductor device. Step 1952 is a process for manufacturing a mask on the basis of the circuit pattern design. Step 1953 is a process for manufacturing a wafer by using a material such as silicon.

Step 1954 is a wafer process that is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1955 is an assembling step, which is called a post-process wherein the wafer processed by step 1954 is formed into semiconductor chips. This step includes assembling (dicing and bonding) and packaging (chip sealing). Step 1956 is an inspection step wherein operability check, durability check and so on of the semiconductor devices produced by step 1955 are carried out. With these processes, semiconductor devices are finished and they are shipped (step 1957).

Figure 17B:
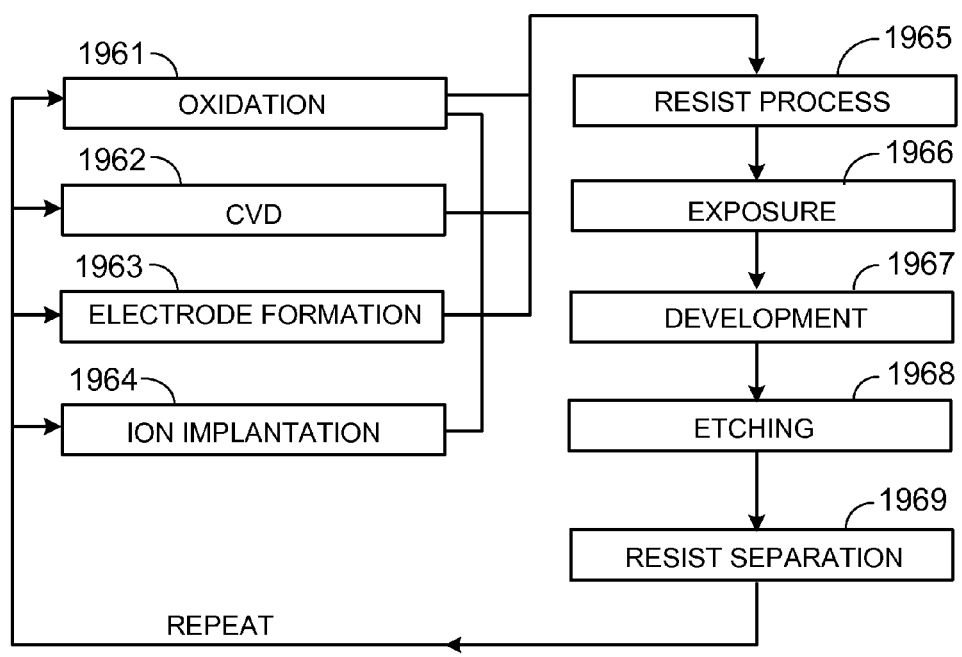

FIG. 17B is a flow chart showing details of the wafer process. Step 1961 is an oxidation process for oxidizing the surface of a wafer. Step 1962 is a CVD process for forming an insulating film on the wafer surface. Step 1963 is an electrode forming process for forming electrodes on the wafer by vapor deposition. Step 1964 is an ion implanting process for implanting ions to the wafer. Step 1965 is a resist process for applying a resist (photosensitive material) to the wafer. Step 1966 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1967 is a developing process for developing the exposed wafer. Step 1968 is an etching process for removing portions other than the developed resist image. Step 1969 is a resist separation process for separating the resist material remaining on the wafer after being subjected to the etching process. By repeating these processes, circuit patterns are formed and superimposed on the wafer.

The encoder systems described above can also be used in other applications in which the relative position of an object needs to be measured precisely. For example, in applications in which a write beam such as a laser, x-ray, ion, or electron beam, marks a pattern onto a substrate as either the substrate or beam moves, the encoder systems can be used to measure the relative movement between the substrate and write beam.

Other embodiments are in the following claims.

What is claimed is:

1. A lithography system, comprising:
a moveable stage;
an illumination system including a radiation source, wherein during operation of the lithography system, the radiation source directs radiation to an object supported by the moveable stage;
a diffractive encoder scale;
a heterodyne optical encoder system comprising an optical assembly arranged to direct a first beam to contact the diffractive encoder scale at a non-Littrow angle at least once and to determine information about at least one degree of freedom of the diffractive encoder scale, the at least one degree of freedom comprising a degree of freedom out of the plane of the encoder scale, wherein either the optical assembly or the encoder scale is attached to the moveable stage; and
a positioning system coupled to the encoder system and configured to adjust a position of the moveable stage based on the information about the degree of freedom of the encoder scale.

2. The lithography system of claim 1, wherein the moveable stage supports a reticle.

3. The lithography system of claim 1, wherein the moveable stage supports a wafer.

4. A system for monitoring at least one degree of freedom of a diffractive encoder scale which extends in a plane, comprising:
an optical assembly configured to derive a first beam and a second beam from an input beam, direct the first and second beams along different paths and combine the first and second beams to form an output beam, the optical assembly being arranged so that when the path of the first beam intersects the diffractive encoder scale, the first beam contacts the diffractive encoder scale at a non-Littrow angle and diffracts from the diffractive encoder scale at least once;
a detector positioned to detect the output beam; and
an electronic processor configured to receive an interference signal from the detector, the interference signal comprising a heterodyne phase related to an optical path difference between the first and second beams, and determine the information about at least one degree of freedom of the encoder scale based on the heterodyne phase, the at least one degree of freedom comprising a degree of freedom out of the plane of the encoder scale.

5. The encoder system of claim 4, wherein the optical assembly comprises a polarizing beam splitter that splits the input beam into the first and second beams.

6. The encoder system of claim 5, wherein the polarizing beam splitter combines the first and second beams to form the output beam.

7. The encoder system of claim 4, wherein the optical assembly comprises one or more optical elements configured to split the input beam into two parallel sub-input beams prior to deriving the first and second beams.

8. The encoder system of claim 7, wherein the optical assembly comprises a beam splitter configured to split one of the sub-input beams into the first and second beams and the split the other sub-input beam into a third and fourth beam, wherein the optical assembly directs the third and fourth beams along different paths and combines the third and fourth beams to form a second output beam.

9. The encoder system of claim 8, wherein the optical assembly directs the third beam to diffract from the encoder scale at least once.

10. The encoder system of claim 9, wherein the optical assembly comprises two retroreflectors positioned to reflect the once-diffracted first and third beams, respectively, to diffract from the encoder scale a second time.

11. The encoder system of claim 10, wherein the first and third beams contact the diffractive encoder scale at different locations.

12. The encoder system of claim 10, wherein the encoder scale diffracts the first and third beams into the +1 and −1 diffraction orders, respectively.

13. The encoder system of claim 4, wherein the at least one degree of freedom comprises a displacement of the diffractive encoder scale along a first axis in the plane of the diffractive encoder scale.

14. The encoder system of claim 4, wherein the at least one degree of freedom comprises a tilt of the encoder scale about an axis.

15. A system, comprising:
a moveable stage; and
the encoder system of claim 4, wherein either the diffractive encoder scale or the optical assembly are attached to the stage.

16. An optical assembly for use with a diffractive encoder scale extending in a plane, the optical assembly comprising:
a polarizing beam splitter arranged to derive a first beam and a second beam from an input beam, direct the first and second beams along different paths, and combine the first and second beams to form an output beam, where the first beam contacts the diffractive encoder scale extending in the plane;
a first reflector positioned facing the plane to receive the first beam after the first beam diffracts from the diffractive encoder scale at a non-Littrow angle, the first reflector being arranged to direct the first beam back towards the diffractive encoder scale;
a second reflector positioned in the path of the second beam and arranged to direct the second beam back towards the beam splitter.

17. The optical assembly of claim 16, wherein the first reflector is a retroreflector.

18. The optical assembly of claim 17, wherein the retroreflector directs the first beam back towards the diffractive encoder scale in a direction parallel to but offset from the path of the first beam from the diffractive encoder scale to the retroreflector.

19. The optical assembly of claim 18, wherein the second reflector is a retroreflector.

20. The optical assembly of claim 16, wherein the polarizing beam splitter is arranged to derive a third beam and a fourth beam from a second input beam, direct the third and fourth beams along different paths, and combine the third and fourth beams to form a second output beam, where the third beam contacts the diffractive encoder scale extending in the plane.

21. The optical assembly of claim 20, wherein the path of the first beam between the polarizing beam splitter and the diffractive encoder scale is parallel to but offset from the path of the third beam between the polarizing beam splitter and the diffractive encoder scale.

22. The optical assembly of claim 21, further comprising a third reflector positioned facing the plane to receive the third beam after the third beam diffracts from the diffractive encoder scale at a non-Littrow angle, the third reflector being arranged to direct the third beam back towards the diffractive encoder scale.

23. The optical assembly of claim 16, wherein the first reflector is positioned to receive first order diffracted light from the diffractive encoder scale when illuminated with the first beam.

* * * * *